(12) United States Patent
Wada

(10) Patent No.: US 8,982,477 B2
(45) Date of Patent: Mar. 17, 2015

(54) ZOOM LENS, OPTICAL APPARATUS AND METHOD FOR MANUFACTURING ZOOM LENS

(75) Inventor: Mitsuaki Wada, Tokyo (JP)

(73) Assignee: Nikon Corporation, Tokyo (JP)

( * ) Notice: Subject to any disclaimer, the term of this patent is extended or adjusted under 35 U.S.C. 154(b) by 93 days.

(21) Appl. No.: 13/480,171

(22) Filed: May 24, 2012

(65) Prior Publication Data

US 2012/0300313 A1 Nov. 29, 2012

Related U.S. Application Data

(60) Provisional application No. 61/608,467, filed on Mar. 8, 2012.

(30) Foreign Application Priority Data

May 25, 2011 (JP) ................................ 2011-117459
Apr. 12, 2012 (JP) ................................ 2012-090649

(51) Int. Cl.
G02B 15/14 (2006.01)
G02B 15/173 (2006.01)
G02B 27/64 (2006.01)

(52) U.S. Cl.
CPC ............ *G02B 15/173* (2013.01); *G02B 27/646* (2013.01); *G03B 2205/0015* (2013.01); *G03B 2205/0046* (2013.01)
USPC ............ 359/690; 359/683; 359/684; 359/685

(58) Field of Classification Search
USPC ............. 359/690, 689, 683–687, 676; 396/72–88; 348/335–357, 348/240.99–240.3, 240, 99–240.3
See application file for complete search history.

(56) References Cited

U.S. PATENT DOCUMENTS

| | | | |
|---|---|---|---|
| 5,103,343 A * | 4/1992 | Sekita ........................... | 359/684 |
| 7,158,315 B2 | 1/2007 | Shibayama | |
| 7,242,532 B2 | 7/2007 | Shibayama et al. | |
| 7,330,316 B2 | 2/2008 | Shibayama et al. | |
| 2009/0086321 A1* | 4/2009 | Mizuguchi et al. ........... | 359/557 |
| 2010/0214658 A1* | 8/2010 | Ito ................................. | 359/557 |
| 2011/0102905 A1* | 5/2011 | Harada ......................... | 359/683 |

FOREIGN PATENT DOCUMENTS

JP 2006-221092 8/2006

* cited by examiner

*Primary Examiner* — Thomas K Pham
*Assistant Examiner* — Cara Rakowski
(74) *Attorney, Agent, or Firm* — Miles & Stockbridge P.C.

(57) ABSTRACT

Including, in order from an object side: a first lens group having positive power; a second lens group having negative power; and a third lens group having positive power, each distance between respective lens groups varying upon zooming; the third lens group including, in order from the object side, a first sub-group having positive power, a second sub-group having positive power, a third sub-group having negative power, and a fourth sub-group having positive power, the first sub-group being movable along an optical axis for focusing, the third sub-group being movable in a direction including a component perpendicular to the optical axis, thereby correcting an image blur, and a given condition being satisfied, thereby providing a compact zoom lens having high optical performance with disposing a focusing lens and a vibration reduction lens in the same lens group, an optical apparatus equipped therewith, and a method for manufacturing the zoom lens.

7 Claims, 19 Drawing Sheets

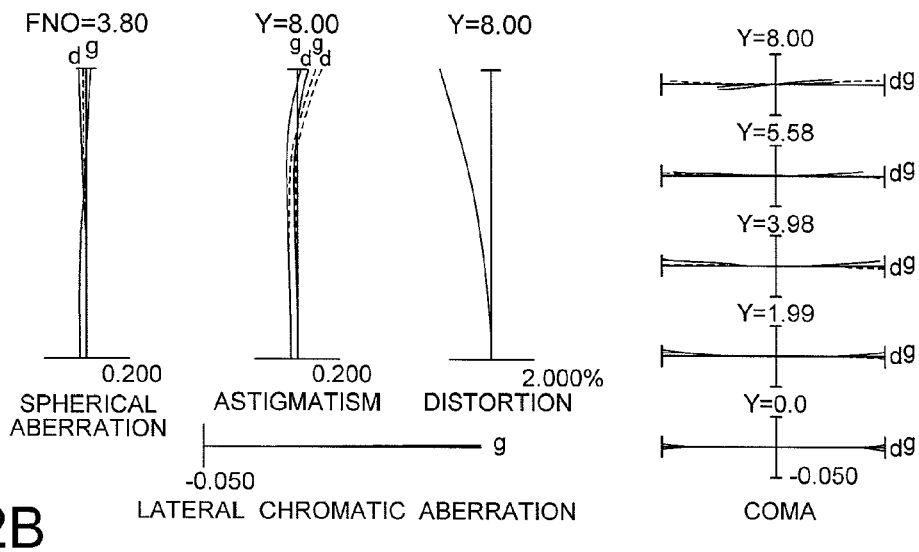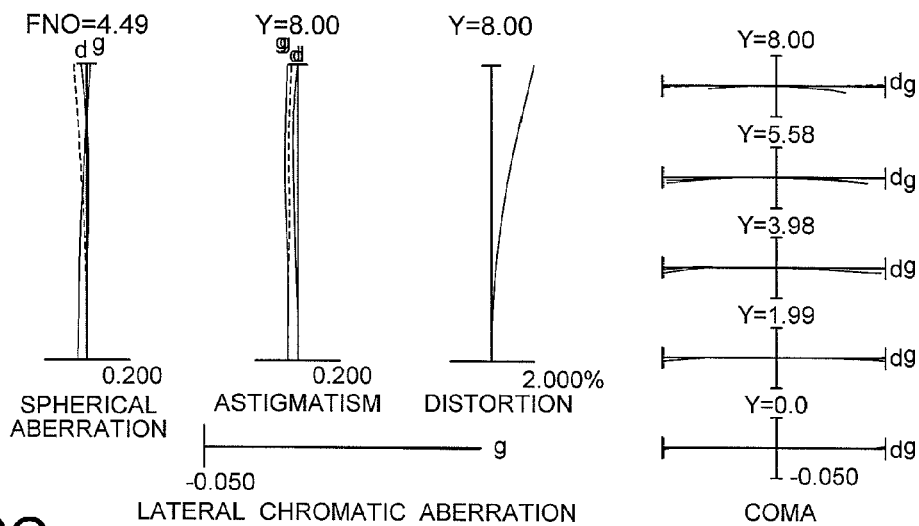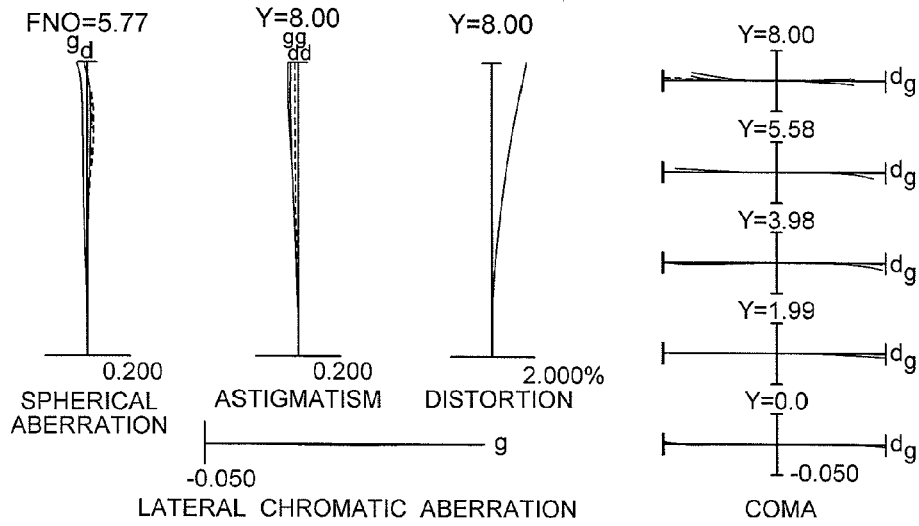

ZOOM LENS, OPTICAL APPARATUS AND METHOD FOR MANUFACTURING ZOOM LENS

CROSS-REFERENCE TO RELATED APPLICATION

This application claims the benefit of U.S. Provisional Patent Application No. 61/608,467 filed on Mar. 8, 2012.

The disclosure of the following priority applications are herein incorporated by reference:

Japanese Patent Application No. 2011-117459 filed on May 25, 2011,

Japanese Patent Application No. 2012-090649 filed on Apr. 12, 2012.

BACKGROUND OF THE INVENTION

1. Field of the Invention

The present invention relates to a zoom lens, an optical apparatus and a method for manufacturing the zoom lens.

2. Related Background Art

Previously, a zoom lens used for an electronic still camera and the like has been proposed (see, for example, Japanese Patent Application Laid-Open No. 2006-221092).

However, in the conventional zoom lens, a lens for focusing and a lens for vibration reduction are disposed in different lens groups, so that respective moving mechanisms have to be provided separately. Accordingly, there has been a problem that the zoom lens is not suitable to be compact.

SUMMARY OF THE INVENTION

The present invention is made in view of the above-described problem, and has an object to provide a zoom lens having high optical performance and being compact with disposing a lens for focusing and a lens for vibration reduction in the same lens group, an optical apparatus equipped therewith, and a method for manufacturing the zoom lens.

According to a first aspect of the present invention, there is provided a zoom lens comprising, in order from an object side: a first lens group having positive refractive power; a second lens group having negative refractive power; and a third lens group having positive refractive power, each distance between respective lens groups varying upon zooming; the third lens group including, in order from the object side, a first sub-group having positive refractive power, a second sub-group having positive refractive power, a third sub-group having negative refractive power, and a fourth sub-group having positive refractive power, the first sub-group being movable along an optical axis, thereby carrying out focusing, the third sub-group being movable in a direction including a component perpendicular to the optical axis, thereby correcting an image blur, and the following conditional expression being satisfied:

$$0.000 < (Ft \times Fw)/(F3 \times X3) < 13.500$$

where Ft denotes a focal length of the whole of the zoom lens in a telephoto end state upon focusing on an infinitely distant object, Fw denotes a focal length of the whole of the zoom lens in a wide-angle end state upon focusing on an infinitely distant object, F3 denotes a focal length of the third lens group, and X3 denotes the maximum moving amount of the third lens group.

According to a second aspect of the present invention, there is provided an optical apparatus equipped with the zoom lens according to the first aspect.

According to a third aspect of the present invention, there is provided a method for manufacturing a zoom lens including, in order from an object side, a first lens group having positive refractive power, a second lens group having negative refractive power, and a third lens group having positive refractive power, the method comprising steps of: disposing, in order from the object side, a first sub-group having positive refractive power, a second sub-group having positive refractive power, a third sub-group having negative refractive power, and a fourth sub-group having positive refractive power into the third lens group; constructing each lens group movably such that each distance between respective lens groups may be varied upon zooming; constructing the first sub-group movably along an optical axis, thereby carrying out focusing; constructing the third sub-group movably in a direction including a component perpendicular to the optical axis, thereby correcting an image blur; and disposing each lens group with satisfying the following conditional expression:

$$0.000 < (Ft \times Fw)/(F3 \times X3) < 13.500$$

where Ft denotes a focal length of the whole of the zoom lens in a telephoto end state upon focusing on an infinitely distant object, Fw denotes a focal length of the whole of the zoom lens in a wide-angle end state upon focusing on an infinitely distant object, F3 denotes a focal length of the third lens group, and X3 denotes the maximum moving amount of the third lens group.

The present invention makes it possible to provide a zoom lens having high optical performance and being compact with disposing a lens for focusing and a lens for vibration reduction in the same lens group, an optical apparatus equipped therewith, and a method for manufacturing the zoom lens.

BRIEF DESCRIPTION OF THE DRAWINGS

FIGS. 2A, 2B and 2C are graphs showing various aberrations of the zoom lens according to Example 1 upon focusing on an infinitely distant object in a wide-angle end state, in an intermediate focal length state and in a telephoto end state, respectively.

DESCRIPTION OF THE MOST PREFERRED EMBODIMENT

Figure 1:
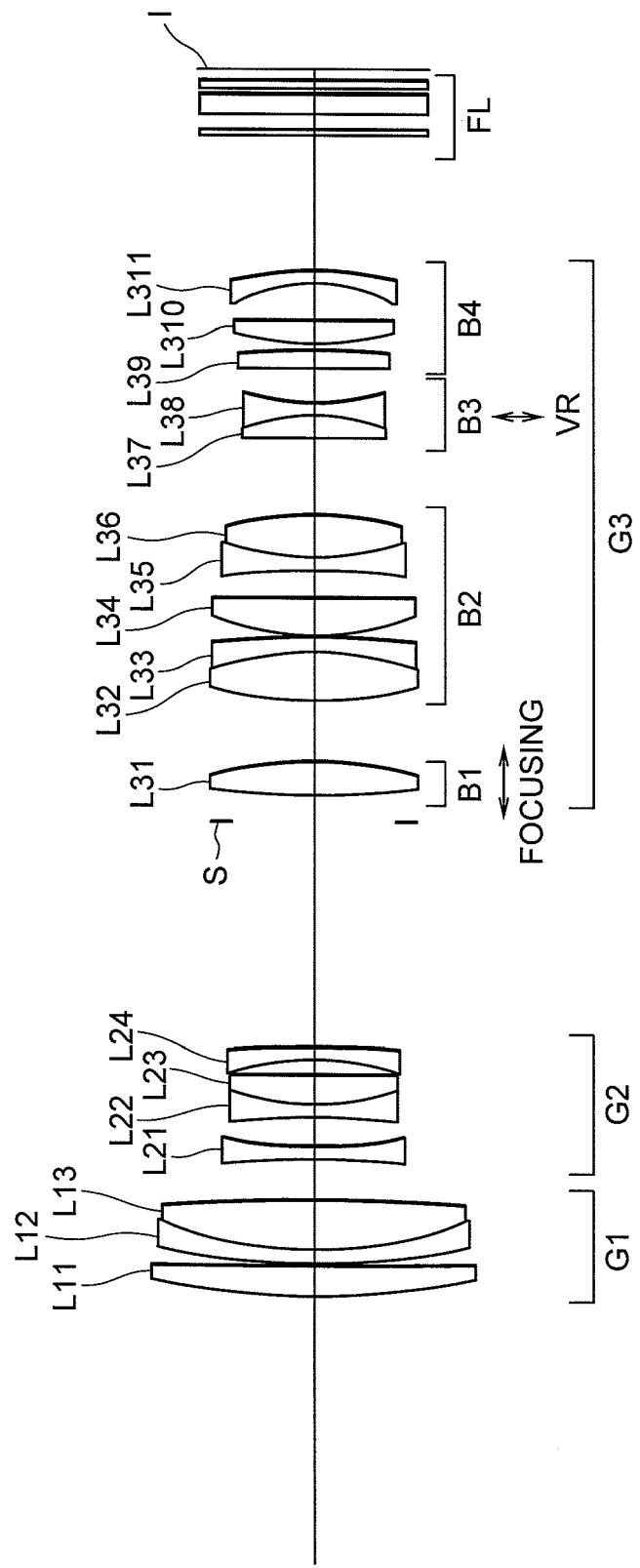
FIG. 1 is a sectional view showing a lens construction of a zoom lens according to Example 1 of the present application.

A zoom lens, an optical apparatus and a method for manufacturing the zoom lens according to the present application are explained below.

A zoom lens according to the present application includes, in order from an object side, a first lens group having positive refractive power, a second lens group having negative refractive power, and a third lens group having positive refractive power. Upon zooming, each distance between respective lens groups vary. The third lens group includes, in order from the object side, a first sub-group having positive refractive power, a second sub-group having positive refractive power, a third sub-group having negative refractive power, and a fourth sub-group having positive refractive power. The first sub-group is moved along an optical axis, thereby carrying out focusing. The third sub-group is moved in a direction including a component perpendicular to the optical axis, thereby correcting an image blur. The following conditional expression (1) is satisfied:

$$0.000 < (Ft \times Fw)/(F3 \times X3) < 13.500 \quad (1)$$

where Ft denotes a focal length of the whole of the zoom lens in a telephoto end state upon focusing on an infinitely distant object, Fw denotes a focal length of the whole of the zoom lens in a wide-angle end state upon focusing on an infinitely distant object, F3 denotes a focal length of the third lens group, and X3 denotes the maximum moving amount of the third lens group.

As described above, the zoom lens according to the present application includes, in order from the object side, the first lens group having positive refractive power, the second lens group having negative refractive power, and the third lens group having positive refractive power. Each distance between respective lens groups vary upon zooming. With this lens construction, the first lens group functions as a converging lens group, the second lens group functions as a zooming lens group, and the third lens group functions as an imaging lens group. Moreover, regarding aberration correction, since the height of incident ray and the angle of incidence in the first lens group and the second lens group vary largely upon zooming, the first lens group and the second lens group have large contributions to variations in spherical aberration and curvature of field upon zooming. The third lens group has small variation in the height of incident ray and the angle of incidence upon zooming, so that the third lens group has small contributions to various aberrations upon zooming.

In the zoom lens according to the present application, the third lens group may secure a long space along the optical axis. Accordingly, a lens for focusing and a lens for vibration reduction may be disposed in the third lens group, in other words, in a single lens group.

Moreover, the first sub-group in the third lens group has small variations in aberrations upon focusing. Accordingly, with moving the first sub-group along the optical axis, focusing movement is carried out.

Moreover, the third sub-group in the third lens group has a small outer diameter, so that the outer circumference thereof is suitable for effectively disposing a driving mechanism for vibration reduction. Accordingly, correction of an image blur, in other words, vibration reduction is carried out by moving the third sub-group in a direction including a component perpendicular to the optical axis.

Moreover, in the zoom lens according to the present application, the above-described conditional expression (1) is satisfied.

Conditional expression (1) defines the ratio of a product of the focal length of the whole of the zoom lens in the telephoto end state upon focusing on an infinitely distant object and the focal length of the whole of the zoom lens in the wide-angle end state upon focusing on an infinitely distant object to a product of the focal length of the third lens group and the maximum moving amount of the third lens group. Incidentally, the maximum moving amount of the third lens group means the maximum moving amount of the third lens group along the optical axis upon zooming. In the zoom lens according to the present application, with satisfying conditional expression (1), it becomes possible to excellently correct various aberrations such as spherical aberration upon focusing.

When the value of conditional expression (1) of the zoom lens according to the present application is equal to or falls below the lower limit, the third lens group moves largely upon zooming so as to gain magnification. Accordingly, spherical aberration is corrected excessively in the telephoto end state, so that it is undesirable. In order to secure the effect of the present application, it is preferable to set the lower limit of conditional expression to 4.000. In order to further secure the effect of the present application, it is greatly preferable to set the lower limit of conditional expression to 6.000. In order to further secure the effect of the present application, it is most preferable to set the lower limit of conditional expression to 8.000.

On the other hand, when the value of conditional expression (1) is equal to or exceeds the upper limit of conditional expression (1), refractive power of each sub-group in the third lens group becomes large, in particular, refractive power of the second sub-group becomes large. As a result, variation in spherical aberration upon focusing becomes large, so that it is undesirable. In order to secure the effect of the present application, it is preferable to set the upper limit of conditional expression (1) to 13.000. In order to further secure the effect of the present application, it is greatly preferable to set the upper limit of conditional expression (1) to 12.500. In order to further secure the effect of the present application, it is most preferable to set the upper limit of conditional expression (1) to 12.000.

With this configuration, it becomes possible to realize the zoom lens having high optical performance and being compact with disposing a lens for focusing and a lens for vibration reduction in the same lens group, an optical apparatus equipped therewith, and a method for manufacturing the zoom lens.

In the zoom lens according to the present application, when a moving amount of image plane upon moving the first lens group along the optical axis is small, it becomes advantageous to make the zoom lens silent. Moreover, refractive power of the third lens group becomes small, so that decentering susceptibility becomes low. As a result, it becomes advantageous to manufacture the zoom lens. Then, in order to suppress variations in aberrations upon focusing and to lower the moving amount of the image plane upon moving the focusing lens along the optical axis, the zoom lens according to the present application preferably satisfies the following conditional expression (2):

$$0.165 < F3/Ft < 0.250 \qquad (2)$$

where F3 denotes a focal length of the third lens group, and Ft denotes a focal length of the whole of the zoom lens in a telephoto end state upon focusing on an infinitely distant object.

Conditional expression (2) defines a ratio of the focal length of the third lens group to the focal length of the whole of the zoom lens in the telephoto end state upon focusing on an infinitely distant object. With satisfying conditional expression (2), the zoom lens according to the present application makes it possible to excellently correct spherical aberration upon focusing. When the value for conditional expression (2) of the zoom lens according to the present application is equal to or falls below the lower limit, refractive power of each sub-group in the third lens group becomes large, in particular, refractive power of the second sub-group becomes large. As a result, variation in spherical aberration upon focusing becomes large, so that it is undesirable.

On the other hand, when the value for conditional expression (2) of the zoom lens according to the present application is equal to or exceeds the upper limit, in order to gain magnification, the third lens group has to move largely upon zooming. Accordingly, spherical aberration is corrected excessively in the telephoto end state, so that it is undesirable.

In the zoom lens according to the present application, the following conditional expression (3) is preferably satisfied:

$$0.45 < F1/Ft < 0.70 \qquad (3)$$

where F1 denotes a focal length of the first lens group, and Ft denotes a focal length of the whole of a zoom lens in the telephoto end state upon focusing on an infinitely distant object.

Conditional expression (3) defines a ratio of the focal length of the first lens group to the focal length of the whole of the zoom lens in the telephoto end state upon focusing on an infinitely distant object. With satisfying conditional expression (3), the zoom lens according to the present application makes it possible to excellently correct various aberrations such as curvature of field.

When the value for conditional expression (3) of the zoom lens according to the present application is equal to or falls below the lower limit, a moving amount of the first lens group upon zooming from the wide-angle end state to the telephoto end state becomes large. As a result, variation in magnification of the third lens group becomes large, so that various aberrations, in particular, curvature of field are affected, so that it is undesirable.

On the other hand, when the value for conditional expression (3) of the zoom lens according to the present application is equal to or exceeds the upper limit, a moving amount of the third lens group upon zooming becomes large. As a result, various aberrations such as curvature of field become large, so that it is undesirable.

In the zoom lens according to the present application, the following conditional expression (4) is preferably satisfied:

$$2.00 < |\beta 3| < 3.00 \qquad (4)$$

where $\beta 3$ denotes the smallest lateral magnification of the third lens group.

Since lateral magnification of the third lens group varies upon zooming, conditional expression (4) defines the smallest value of lateral magnification of the third lens group. With satisfying conditional expression (4), the zoom lens according to the present application makes it possible to excellently correct various aberrations such as curvature of field.

When the value for conditional expression (4) of the zoom lens according to the present application is equal to or falls below the lower limit, the moving amount of the first lens group upon zooming becomes small, and the moving amount of the third lens group upon zooming becomes large. As a result, it becomes difficult to correct various aberrations such as curvature of field, so that it is undesirable.

On the other hand, when the value for conditional expression (4) of the zoom lens according to the present application is equal to or exceeds the upper limit, the moving amount of the first lens group upon zooming becomes large, and the moving amount of the third lens group upon zooming becomes small, so that variation in lateral magnification becomes large. As a result, it becomes difficult to correct various aberrations such as curvature of field upon zooming, so that it is undesirable.

In the zoom lens according to the present application, the fourth sub-group preferably includes at least one positive lens element and at least two negative lens elements. With this configuration, the zoom lens according to the present application makes it possible to realize excellent optical performance.

Moreover, in the zoom lens according to the present application, the fourth sub-group preferably includes at least two positive lens elements and at least one negative lens element.

With this configuration, the zoom lens according to the present application makes it possible to realize excellent optical performance.

An optical apparatus according to the present application is characterized by being equipped with the above-described zoom lens. With this configuration, it becomes possible to realize an optical apparatus having high optical performance and being compact with disposing a lens for focusing and a lens for vibration reduction in the same lens group.

A method for manufacturing a zoom lens according to the present application including, in order from an object side, a first lens group having positive refractive power, a second lens group having negative refractive power, and a third lens group having positive refractive power, the method comprising steps of: constructing the third lens group including, in order from the object side, a first sub-group having positive refractive power, a second sub-group having positive refractive power, a third sub-group having negative refractive power, and a fourth sub-group having positive refractive power; constructing each lens group movably such that each distance between respective lens groups may be variable upon zooming; constructing the first sub-group movably along the optical axis, thereby carrying out focusing; constructing the third sub-group movably in a direction including a component perpendicular to the optical axis, thereby correcting an image blur; and disposing each lens group with satisfying the following conditional expression (1):

$$0.000 < (Ft \times Fw)/(F3 \times X3) < 13.500 \quad (1)$$

where Ft denotes a focal length of the whole of the zoom lens in a telephoto end state upon focusing on an infinitely distant object, Fw denotes a focal length of the whole of the zoom lens in a wide-angle end state upon focusing on an infinitely distant object, F3 denotes a focal length of the third lens group, and X3 denotes the maximum moving amount of the third lens group. With this construction, it becomes possible to manufacture the zoom lens having high optical performance and being compact with disposing a lens for focusing and a lens for vibration reduction in the same lens group.

A zoom lens according to each numerical example of the present application is explained below with reference to accompanying drawings.

Example 1

FIG. 1 is a sectional view showing a lens construction of a zoom lens according to Example 1 of the present application in a wide-angle end state upon focusing on an infinitely distant object.

The zoom lens according to Example 1 is composed of, in order from an object side, a first lens group G1 having positive refractive power, a second lens group G2 having negative refractive power, and a third lens group G3 having positive refractive power.

The first lens group G1 is composed of, in order from the object side, a positive meniscus lens L11 having a convex surface facing the object side, and a cemented lens constructed by a negative meniscus lens L12 having a convex surface facing the object side cemented with a double convex positive lens L13.

The second lens group G2 is composed of, in order from the object side, a double concave negative lens L21, a cemented lens constructed by a double concave negative lens L22 cemented with a positive meniscus lens L23 having a convex surface facing the object side, and a negative meniscus lens L24 having a concave surface facing the object side.

The third lens group G3 is composed of, in order from the object side, an aperture stop S, a first sub-group B1 having positive refractive power, a second sub-group B2 having positive refractive power, a third sub-group B3 having negative refractive power, and a fourth sub-group B4 having positive refractive power.

The first sub-group B1 is composed of a double convex positive lens L31 only.

The second sub-group B2 is composed of, in order from the object side, a cemented lens constructed by a double convex positive lens L32 cemented with a negative meniscus lens L33 having a concave surface facing the object side, a positive meniscus lens L34 having a convex surface facing the object side, and a cemented lens constructed by a double concave negative lens L35 cemented with a double convex positive lens L36.

The third sub-group B3 is composed of, in order from the object side, a cemented lens constructed by a positive meniscus lens L37 having a concave surface facing the object side cemented with a double concave negative lens L38 only.

The fourth sub-group B4 is composed of, in order from the object side, a double convex positive lens L39, a positive meniscus lens L310 having a convex surface facing the object side, and a negative meniscus lens L311 having a concave surface facing the object side.

Incidentally, a filter group FL is disposed in the vicinity of the image plane I. The filter group FL is composed of, in order from the object side, a dustproof glass, an optical low-pass filter, and a cover glass for a solid-state imaging device.

In the zoom lens according to Example 1, upon zooming from a wide-angle end state to a telephoto end state, the first lens group G1 is moved to the object side, the second lens group G2 is moved at first to the image side and then to the object side, and the third lens group G3 is moved to the object side such that a distance between the first lens group G1 and the second lens group G2 varies, and a distance between the second lens group G2 and the third lens group G3 varies.

In the zoom lens according to Example 1, the first sub-group B1 in the third lens group G3 is moved along an optical axis, thereby carrying out focusing from an infinitely distant object to a close object.

In the zoom lens according to Example 1, the third sub-group B3 in the third lens group G3 is moved in a direction including a component perpendicular to the optical axis, thereby correcting an image blur, in other words, carrying out vibration reduction.

In a lens system having a focal length of f, and a vibration reduction coefficient (a ratio of a moving amount of an image on the image plane to a moving amount of a vibration reduction lens group) of K, in order to correct a rotational camera shake of θ degree, the vibration reduction lens group is to be moved in a direction perpendicular to the optical axis by a moving amount of (f·tan θ)/K. Accordingly, in the zoom lens according to Example 1, in the wide-angle end state, the vibration reduction coefficient is 1.287, the focal length is 30.00007 (mm), so that in order to correct a rotational camera shake of 0.30 degrees, the moving amount of the third sub-group B3 is 0.122 (mm). In the telephoto end state, the vibration reduction coefficient is 1.918, the focal length is 107.00069 (mm), so that in order to correct a rotational camera shake of 0.30 degrees, the moving amount of the third sub-group B3 is 0.292 (mm).

Incidentally, a diagonal length between the center and a corner of the solid-state imaging device in the zoom lens according to Example 1 is 8.5 mm.

Various values associated with the zoom lens according to Example 1 are listed below in Table 1.

In Table 1, f denotes a focal length, FNO denotes an f-number, SUM.D denotes a distance between the most object side lens surface and the most image side lens surface of the zoom lens, T.L. denotes a total lens length of the zoom lens, which is a distance between the most object side lens surface and the image plane I of the zoom lens, ACT.L. denotes an air converted value of the total lens length, Bf denotes a distance between the most image side lens surface and the image plane I, and ACBf denotes an air converted value of the back focal length. Moreover, W indicates a wide-angle end state, M indicates an intermediate focal length state, T indicates a telephoto end state, and VR means a vibration reduction.

In (Surface Data), m denotes a surface number that is the order of optical surfaces counted in order from the object side, r denotes a radius of curvature, d denotes a surface distance along the optical axis, nd denotes a refractive index at d-line (wavelength λ=587.6 nm), ng denotes a refractive index at g-line (wavelength λ=435.8 nm), nC denotes a refractive index at C-line (wavelength λ=656.3 nm), and nF denotes a refractive index at F-line (wavelength λ=486.1 nm). Moreover, Op denotes an object plane, (S) denotes an aperture stop S, and I denotes an image plane. Incidentally, a radius of curvature r=∞ indicates a plane surface, and a refractive index of the air 1.000000 is omitted.

Here, "mm" is generally used for the unit of length such as the focal length, the radius of curvature and the like shown in Table 1. However, since similar optical performance can be obtained by an optical system proportionally enlarged or reduced its dimension, the unit is not necessarily to be limited to this. The explanation of reference symbols is the same in the other Examples.

TABLE 1

Example 1

(Surface Data)

| m | r | d | nd | ng | nC | nF |
|---|---|---|---|---|---|---|
| Op | ∞ | | | | | |
| 1) | 54.41704 | 2.30000 | 1.516800 | 1.526700 | 1.514320 | 1.522380 |
| 2) | 342.62842 | 0.10000 | | | | |
| 3) | 49.86783 | 1.10000 | 1.795040 | 1.831540 | 1.787030 | 1.814740 |
| 4) | 29.95421 | 3.80000 | 1.497820 | 1.505260 | 1.495980 | 1.502010 |
| 5) | −207.88291 | (d5) | | | | |
| 6) | −73.16056 | 1.00000 | 1.487490 | 1.495930 | 1.485350 | 1.492270 |
| 7) | 27.55570 | 2.10000 | | | | |
| 8) | −67.04858 | 1.00000 | 1.795000 | 1.817120 | 1.789740 | 1.807290 |
| 9) | 17.77528 | 2.30000 | 1.846660 | 1.894190 | 1.836490 | 1.872100 |
| 10) | 2247.19750 | 1.00000 | | | | |
| 11) | −23.40360 | 1.00000 | 1.658440 | 1.674690 | 1.654550 | 1.667490 |
| 12) | −125.17500 | (d12) | | | | |
| 13) (S) | ∞ | (d13) | | | | |
| 14) | 66.27637 | 2.60000 | 1.487490 | 1.495930 | 1.485350 | 1.492270 |
| 15) | −29.47900 | (d15) | | | | |
| 16) | 27.79036 | 3.70000 | 1.497820 | 1.505260 | 1.495980 | 1.502010 |
| 17) | −21.03415 | 1.00000 | 1.850260 | 1.884500 | 1.842600 | 1.868880 |
| 18) | −116.85644 | 0.10000 | | | | |
| 19) | 18.42576 | 2.80000 | 1.618000 | 1.630100 | 1.615040 | 1.624790 |
| 20) | 399.05207 | 2.06863 | | | | |
| 21) | −49.18829 | 1.00000 | 1.850260 | 1.884500 | 1.842600 | 1.868880 |
| 22) | 19.62577 | 3.30000 | 1.592700 | 1.614540 | 1.587790 | 1.604580 |
| 23) | −24.63603 | 5.68926 | | | | |
| 24) | −4591.93900 | 1.70000 | 1.846660 | 1.894190 | 1.836490 | 1.872100 |
| 25) | −15.74005 | 0.95000 | 1.806100 | 1.831150 | 1.800250 | 1.819940 |
| 26) | 16.84314 | 2.50001 | | | | |
| 27) | 150.45862 | 1.50000 | 1.487490 | 1.495930 | 1.485350 | 1.492270 |
| 28) | −85.38036 | 0.39186 | | | | |
| 29) | 19.84256 | 1.80000 | 1.589130 | 1.601030 | 1.586190 | 1.595820 |
| 30) | 319.23265 | 2.74664 | | | | |
| 31) | −12.42116 | 1.00000 | 1.734000 | 1.751750 | 1.729690 | 1.743940 |
| 32) | −26.23494 | (d32) | | | | |
| 33) | ∞ | 0.50000 | 1.516800 | 1.526700 | 1.514320 | 1.522380 |
| 34) | ∞ | 1.11000 | | | | |
| 35) | ∞ | 1.59000 | 1.516800 | 1.526700 | 1.514320 | 1.522380 |
| 36) | ∞ | 0.30000 | | | | |
| 37) | ∞ | 0.70000 | 1.516800 | 1.526700 | 1.514320 | 1.522380 |
| 38) | ∞ | 0.71827 | | | | |
| I | ∞ | | | | | |

(Various Data)
zoom ratio: 3.57

| | W | M | T |
|---|---|---|---|
| f | 30.00007 | 60.00020 | 107.00069 |
| FNO | 3.803 | 4.497 | 5.767 |

(Distances upon focusing on an infinitely distant object)

| | | | |
|---|---|---|---|
| d5 | 3.00535 | 15.04519 | 19.49644 |
| d12 | 17.00519 | 8.43138 | 1.19999 |
| d13 | 1.97000 | 1.97000 | 1.97000 |

TABLE 1-continued

Example 1

| | | | |
|---|---|---|---|
| d15 | 4.47307 | 4.47307 | 4.47307 |
| d32 | 10.09999 | 16.36860 | 27.90584 |
| SUM. D | 77.00001 | 80.46604 | 77.6859 |
| T.L. | 92.01827 | 101.75292 | 110.51003 |
| ACT. L. | 91.06766 | 100.80230 | 109.55940 |
| Bf | 15.01825 | 21.28687 | 32.82411 |
| ACBf | 14.06765 | 20.33627 | 31.87350 |
| (Distances upon focusing on a close object) | | | |
| d5 | 3.00535 | 15.04519 | 19.49644 |
| d12 | 17.00519 | 8.43138 | 1.19999 |
| d13 | 2.84958 | 3.91471 | 5.28708 |
| d15 | 3.59349 | 2.52836 | 1.15599 |
| d32 | 10.09999 | 16.36860 | 27.90584 |
| SUM. D | 77.00001 | 80.46604 | 77.6859 |
| T.L. | 92.01827 | 101.75292 | 110.51003 |
| (Moving Amounts of VR lens and image plane I upon VR) | | | |
| f | 30.00000 | 60.00000 | 107.00000 |
| VR lens | ±0.122 | ±0.211 | ±0.292 |
| I | ±0.157 | ±0.314 | ±0.560 |
| β | −0.03156 | −0.06044 | −0.10444 |
| VR lens | ±0.122 | ±0.211 | ±0.292 |
| I | ±0.157 | ±0.314 | ±0.560 |

(Values for Conditional Expressions)

| | |
|---|---|
| (1) (Ft × Fw)/(F3 × X3) = | 9.277 |
| (2) F3/Ft = | 0.182 |
| (3) F1/Ft = | 0.573 |
| (4) \|β3\| = | 2.758 |

FIGS. 2A, 2B and 2C are graphs showing various aberrations of the zoom lens according to Example 1 upon focusing on an infinitely distant object in a wide-angle end state, in an intermediate focal length state and in a telephoto end state, respectively.

Figure 3A:
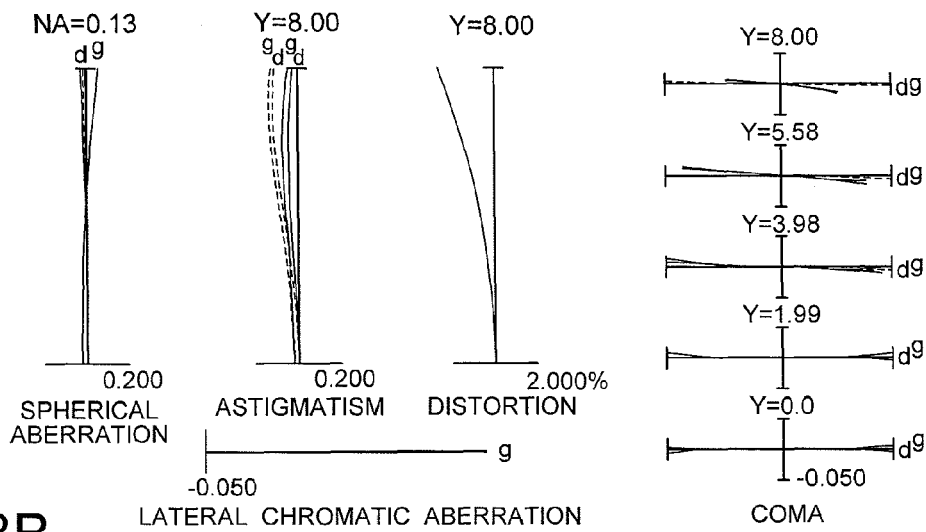
FIGS. 3A, 3B and 3C are graphs showing various aberrations of the zoom lens according to Example 1 upon focusing on a close object in the wide-angle end state, in the intermediate focal length state and in the telephoto end state, respectively.
Figure 3B:
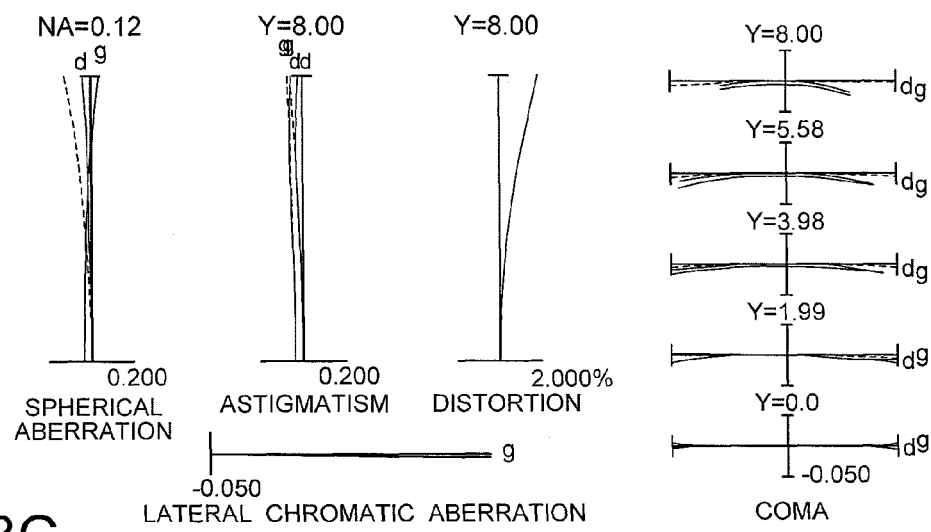
Figure 3C:
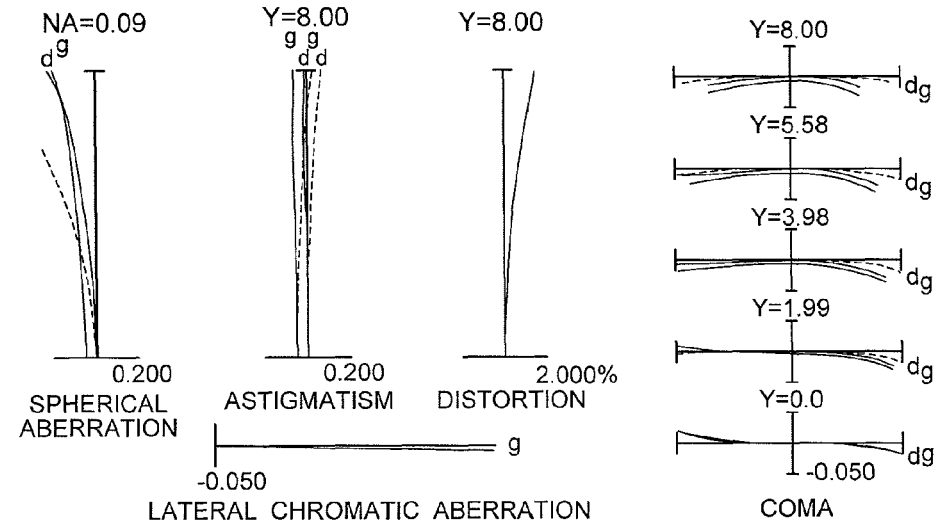

FIGS. 3A, 3B and 3C are graphs showing various aberrations of the zoom lens according to Example 1 upon focusing on a close object in the wide-angle end state, in the intermediate focal length state and in the telephoto end state, respectively.

Figure 4A:
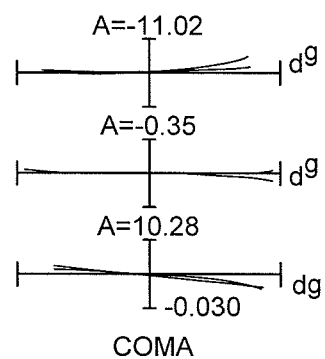
FIGS. 4A, and 4B are graphs showing coma of the zoom lens according to Example 1 upon focusing on an infinitely distant object and carrying out vibration reduction in the wide-angle end state and in the telephoto end state, respectively.
Figure 4B:
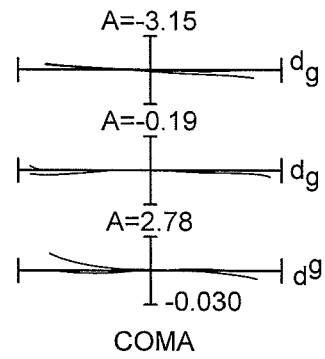

FIGS. 4A, and 4B are graphs showing coma of the zoom lens according to Example 1 upon focusing on an infinitely distant object and carrying out vibration reduction in the wide-angle end state and in the telephoto end state, respectively.

In respective graphs, FNO denotes an f-number, Y denotes an image height, A denotes a half angle of view (unit: degree). "d" indicates an aberration curve at d-line (wavelength λ=587.6 nm), "g" indicates an aberration curve at g-line (wavelength λ=435.8 nm). In graphs showing astigmatism, a solid line indicates a sagittal image plane, and a broken line indicates a meridional image plane. In graphs showing lateral chromatic aberration, aberration curve is drawn with using aberration curve at d-line as the reference. The above-described explanations regarding various aberration graphs according to the present example are the same as the other Examples.

As is apparent from the respective graphs, the zoom lens according to Example 1 shows superb optical performance as a result of good corrections to various aberrations in each focal length state from the wide-angle end state through the telephoto end state even upon carrying out vibration reduction.

Example 2

Figure 5:
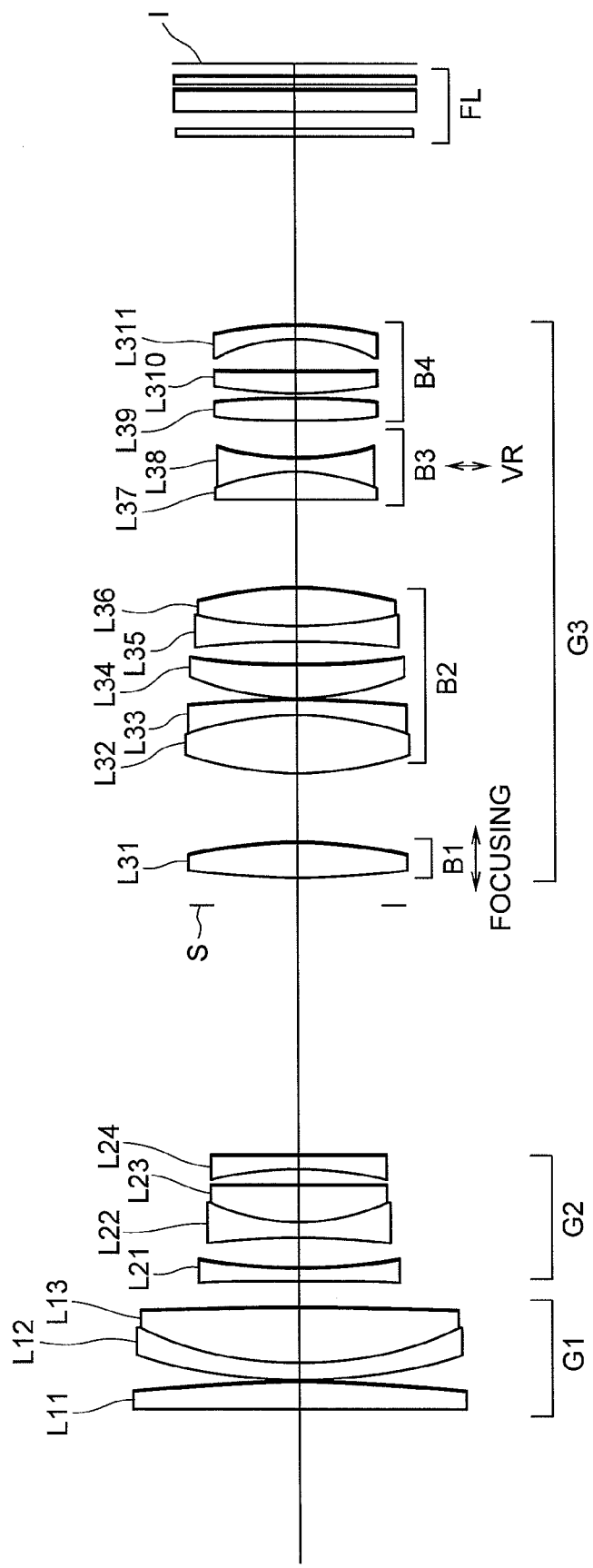
FIG. 5 is a sectional view showing a lens construction of a zoom lens according to Example 2 of the present application.

FIG. 5 is a sectional view showing a lens construction of a zoom lens according to Example 2 of the present application in a wide-angle end state upon focusing on an infinitely distant object.

The zoom lens according to Example 2 is composed of, in order from an object side, a first lens group G1 having positive refractive power, a second lens group G2 having negative refractive power, and a third lens group G3 having positive refractive power.

The first lens group G1 is composed of, in order from the object side, a double convex positive lens L11, and a cemented lens constructed by a negative meniscus lens L12 having a convex surface facing the object side cemented with a double convex positive lens L13.

The second lens group G2 is composed of, in order from the object side, a double concave negative lens L21, a cemented lens constructed by a double concave negative lens L22 cemented with a positive meniscus lens L23 having a convex surface facing the object side, and a double concave negative lens L24.

The third lens group G3 is composed of, in order from the object side, an aperture stop S, a first sub-group B1 having positive refractive power, a second sub-group B2 having positive refractive power, a third sub-group B3 having negative refractive power, and a fourth sub-group B4 having positive refractive power.

The first sub-group B1 is composed of a double convex positive lens L31 only.

The second sub-group B2 is composed of, in order from the object side, a cemented lens constructed by a double convex positive lens L32 cemented with a negative meniscus lens L33 having a concave surface facing the object side, a positive meniscus lens L34 having a convex surface facing the object side, and a cemented lens constructed by a double concave negative lens L35 cemented with a double convex positive lens L36.

The third sub-group B3 is composed of, in order from the object side, a cemented lens constructed by a positive meniscus lens L37 having a concave surface facing the object side cemented with a double concave negative lens L38 only.

The fourth sub-group B4 is composed of, in order from the object side, a double convex positive lens L39, a positive meniscus lens L310 having a convex surface facing the object side, and a negative meniscus lens L311 having a concave surface facing the object side.

Incidentally, a filter group FL is disposed in the vicinity of the image plane I. The filter group FL is composed of, in order from the object side, a dustproof glass, an optical low-pass filter, and a cover glass for a solid-state imaging device.

In the zoom lens according to Example 2, upon zooming from a wide-angle end state to a telephoto end state, the first lens group G1 is moved to the object side, the second lens group G2 is moved at first to the image side and then to the object side, and the third lens group G3 is moved to the object side such that a distance between the first lens group G1 and the second lens group G2 varies, and a distance between the second lens group G2 and the third lens group G3 varies.

In the zoom lens according to Example 2, the first sub-group B1 in the third lens group G3 is moved along an optical axis, thereby carrying out focusing from an infinitely distant object to a close object.

In the zoom lens according to Example 2, the third sub-group B3 in the third lens group G3 is moved in a direction including a component perpendicular to the optical axis, thereby carrying out vibration reduction.

In the zoom lens according to Example 2, in the wide-angle end state, the vibration reduction coefficient is 1.227, the focal length is 30.00000 (mm), so that in order to correct a rotational camera shake of 0.30 degrees, the moving amount of the third sub-group B3 is 0.128 (mm). In the telephoto end state, the vibration reduction coefficient is 1.848, the focal length is 107.00000 (mm), so that in order to correct a rotational camera shake of 0.30 degrees, the moving amount of the third sub-group B3 is 0.303 (mm).

Incidentally, a diagonal length between the center and a corner of the solid-state imaging device in the zoom lens according to Example 2 is 8.5 mm.

Various values associated with the zoom lens according to Example 2 are listed below in Table 2.

TABLE 2

Example 2

(Surface Data)

| m | r | d | nd | ng | nC | nF |
|---|---|---|---|---|---|---|
| Op | ∞ | | | | | |
| 1) | 500.00000 | 2.00000 | 1.487490 | 1.495932 | 1.485345 | 1.492269 |
| 2) | −108.88895 | 0.10000 | | | | |
| 3) | 36.38273 | 1.10000 | 1.795041 | 1.831539 | 1.787031 | 1.814744 |
| 4) | 25.21266 | 3.85000 | 1.497820 | 1.505265 | 1.495980 | 1.502013 |
| 5) | −449.99814 | (d5) | | | | |
| 6) | −500.00000 | 1.00000 | 1.487490 | 1.495932 | 1.485345 | 1.492269 |
| 7) | 35.34774 | 2.00000 | | | | |
| 8) | −46.60240 | 1.00000 | 1.799520 | 1.823514 | 1.793875 | 1.812802 |
| 9) | 13.66861 | 2.45000 | 1.846660 | 1.894191 | 1.836491 | 1.872100 |
| 10) | 158.14521 | 1.10000 | | | | |
| 11) | −27.07066 | 1.00000 | 1.658441 | 1.674690 | 1.654554 | 1.667493 |
| 12) | 499.99945 | (d12) | | | | |
| 13) (S) | ∞ | (d13) | | | | |
| 14) | 55.79579 | 2.40000 | 1.487490 | 1.495932 | 1.485345 | 1.492269 |
| 15) | −33.25134 | (d15) | | | | |
| 16) | 21.71059 | 4.00000 | 1.497820 | 1.505265 | 1.495980 | 1.502013 |
| 17) | −21.71059 | 1.00000 | 1.850260 | 1.884499 | 1.842595 | 1.868880 |
| 18) | −97.96206 | 0.10000 | | | | |
| 19) | 18.40545 | 2.30000 | 1.618000 | 1.630099 | 1.615035 | 1.624787 |
| 20) | 52.05846 | 1.50000 | | | | |
| 21) | −63.74832 | 1.00000 | 1.850260 | 1.884499 | 1.842595 | 1.868880 |
| 22) | 26.46966 | 2.70000 | 1.581439 | 1.599729 | 1.577215 | 1.591488 |
| 23) | −26.46969 | 5.99500 | | | | |
| 24) | −262.52644 | 1.85000 | 1.846660 | 1.894191 | 1.836491 | 1.872100 |
| 25) | −14.33840 | 0.95000 | 1.806100 | 1.831152 | 1.800252 | 1.819941 |
| 26) | 17.14965 | 2.50000 | | | | |
| 27) | 41.29359 | 1.60000 | 1.518229 | 1.529148 | 1.515554 | 1.524348 |
| 28) | −70.80392 | 0.20000 | | | | |
| 29) | 21.69467 | 1.60000 | 1.579570 | 1.593079 | 1.576319 | 1.587110 |
| 30) | 105.00000 | 2.14810 | | | | |
| 31) | −11.91820 | 1.00000 | 1.754999 | 1.772958 | 1.750625 | 1.765057 |
| 32) | −24.46893 | (d32) | | | | |
| 33) | ∞ | 0.50000 | 1.516800 | 1.526703 | 1.514322 | 1.522384 |
| 34) | ∞ | 1.11000 | | | | |
| 35) | ∞ | 1.59000 | 1.516800 | 1.526703 | 1.514322 | 1.522384 |
| 36) | ∞ | 0.30000 | | | | |
| 37) | ∞ | 0.70000 | 1.516800 | 1.526703 | 1.514322 | 1.522384 |
| 38) | ∞ | 0.70001 | | | | |
| I | ∞ | | | | | |

TABLE 2-continued

Example 2

(Various Data)
zoom ratio: 3.57

|  | W | M | T |
|---|---|---|---|
| f | 30.00000 | 59.99957 | 106.99860 |
| FNO | 4.124 | 4.262 | 4.691 |

(Distances upon focusing on an infinitely distant object)

|  | W | M | T |
|---|---|---|---|
| d5 | 1.69000 | 15.31650 | 20.58520 |
| d12 | 16.91000 | 9.30253 | 2.01355 |
| d13 | 1.97000 | 1.97000 | 1.97000 |
| d15 | 4.59151 | 4.59151 | 4.59151 |
| d32 | 12.79420 | 17.82727 | 27.29623 |
| SUM. D | 90.59880 | 96.61783 | 94.59755 |
| T.L. | 91.29881 | 102.34951 | 109.79730 |
| ACT. L. | 90.34923 | 101.4003 | 108.84900 |
| Bf | 17.69522 | 22.72728 | 32.19624 |
| ACBf | 16.74462 | 21.77668 | 31.24564 |

(Distances upon focusing on a close object)

|  | W | M | T |
|---|---|---|---|
| d5 | 1.69000 | 15.31650 | 20.58520 |
| d12 | 16.91000 | 9.30253 | 2.01355 |
| d13 | 2.69150 | 3.80674 | 5.00151 |
| d15 | 3.87001 | 2.75477 | 1.56000 |
| d32 | 12.79420 | 17.82727 | 27.29623 |
| SUM. D | 73.60061 | 79.62364 | 77.60336 |
| T.L. | 91.29881 | 102.34951 | 109.79730 |

(Moving Amounts of VR lens and image plane I upon VR)

|  | W | M | T |
|---|---|---|---|
| f | 30.00000 | 60.00000 | 107.00000 |
| VR lens | ±0.128 | ±0.221 | ±0.303 |
| I | ±0.157 | ±0.314 | ±0.560 |
| β | −0.03154 | −0.06033 | −0.10411 |
| VR lens | ±0.128 | ±0.221 | ±0.303 |
| I | ±0.157 | ±0.314 | ±0.560 |

(Values for Conditional Expressions)

| | |
|---|---|
| (1) (Ft × Fw)/(F3 × X3) = | 11.395 |
| (2) F3/Ft = | 0.182 |
| (3) F1/Ft = | 0.559 |
| (4) \|β3\| = | 2.675 |

Figure 6A:
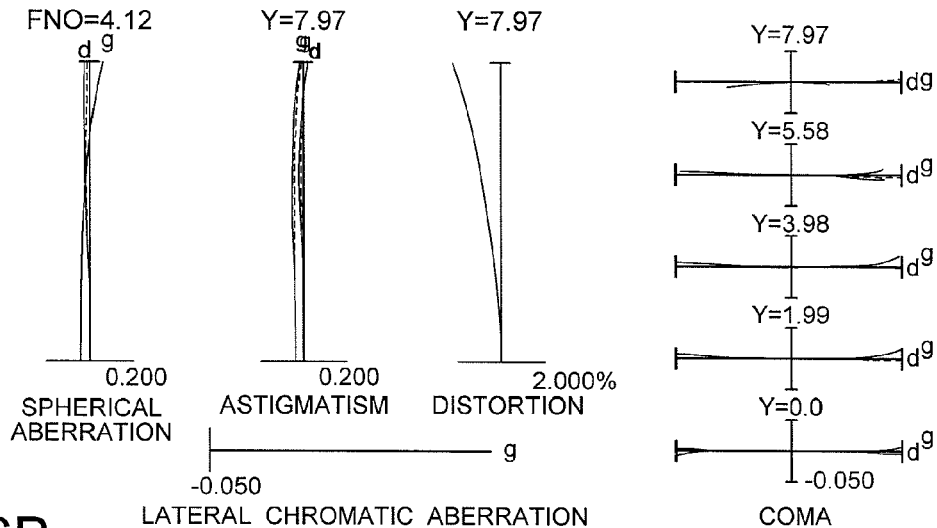
FIGS. 6A, 6B and 6C are graphs showing various aberrations of the zoom lens according to Example 2 upon focusing on an infinitely distant object in a wide-angle end state, in an intermediate focal length state and in a telephoto end state, respectively.
Figure 6B:
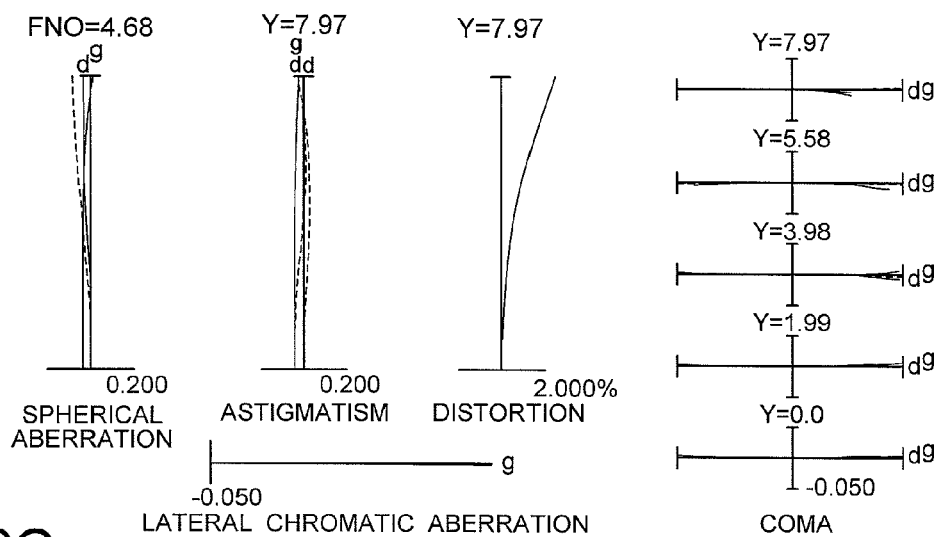
Figure 6C:
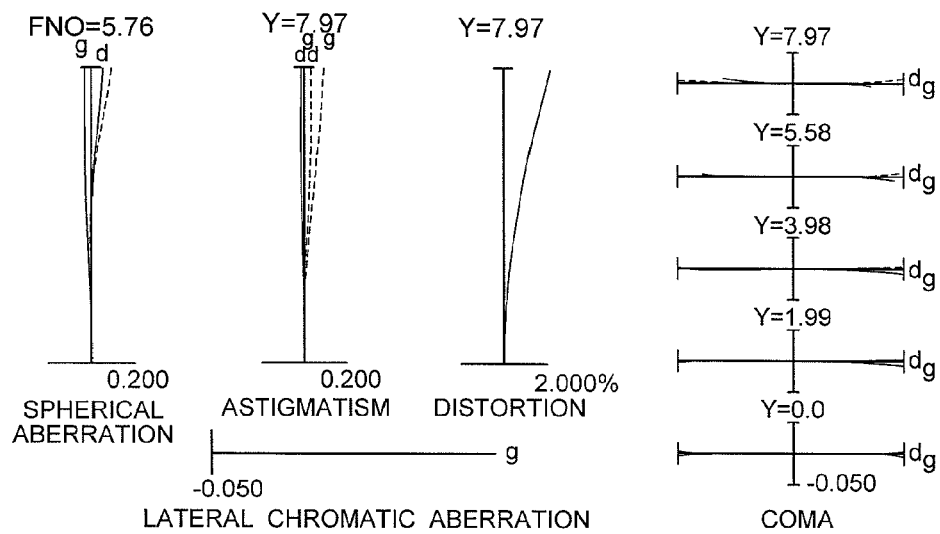

FIGS. 6A, 6B and 6C are graphs showing various aberrations of the zoom lens according to Example 2 upon focusing on an infinitely distant object in a wide-angle end state, in an intermediate focal length state and in a telephoto end state, respectively.

Figure 7A:
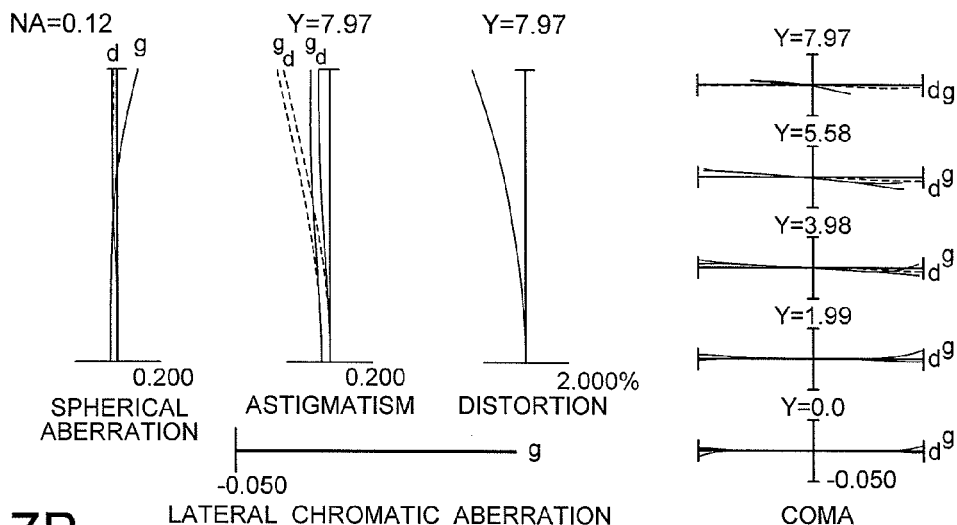
FIGS. 7A, 7B and 7C are graphs showing various aberrations of the zoom lens according to Example 2 upon focusing on a close object in the wide-angle end state, in the intermediate focal length state and in the telephoto end state, respectively.
Figure 7B:
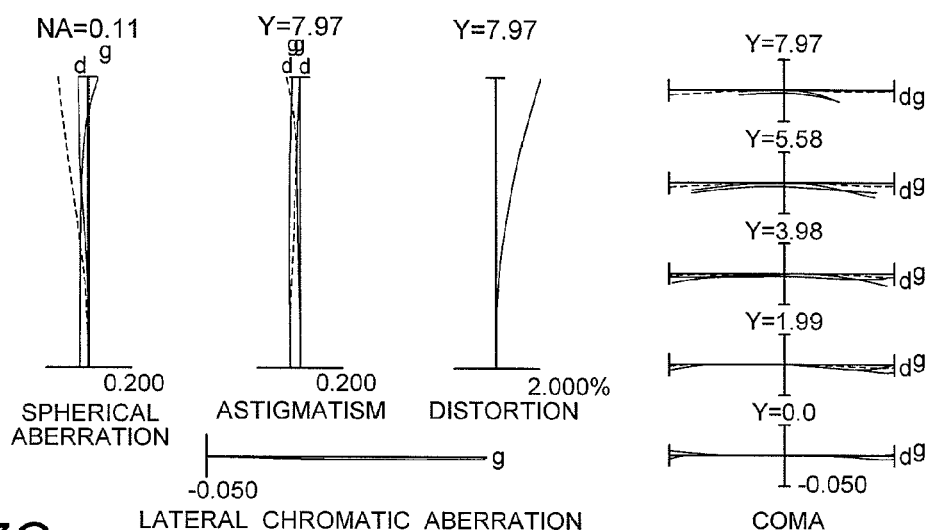
Figure 7C:
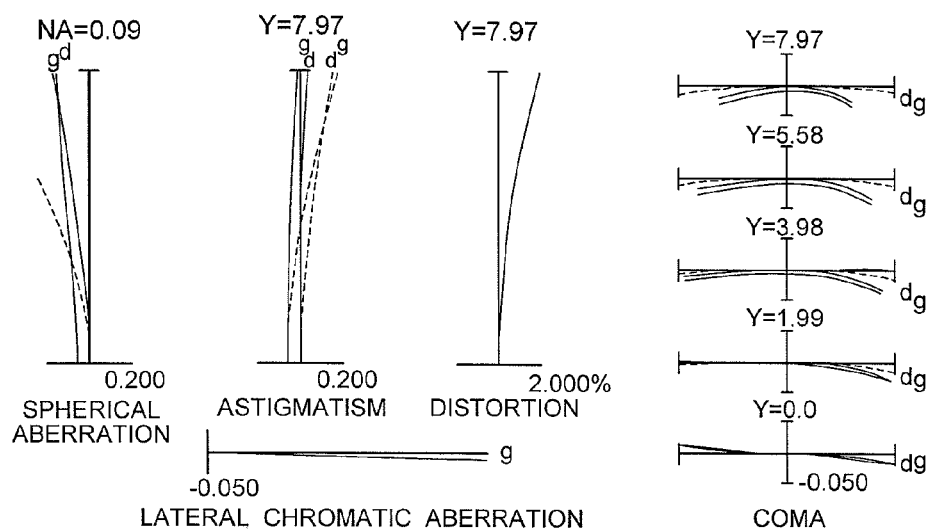

FIGS. 7A, 7B and 7C are graphs showing various aberrations of the zoom lens according to Example 2 upon focusing on a close object in the wide-angle end state, in the intermediate focal length state and in the telephoto end state, respectively.

Figure 8A:
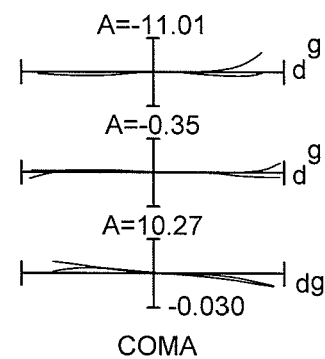
FIGS. 8A and 8B are graphs showing coma of the zoom lens according to Example 2 upon focusing on an infinitely distant object and carrying out vibration reduction in the wide-angle end state and in the telephoto end state, respectively.
Figure 8B:
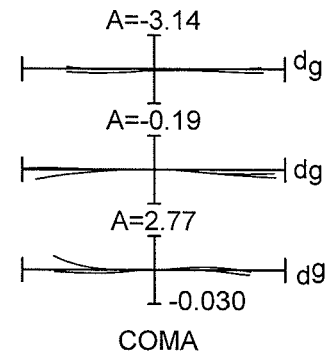

FIGS. 8A and 8B are graphs showing coma of the zoom lens according to Example 2 upon focusing on an infinitely distant object and carrying out vibration reduction in the wide-angle end state and in the telephoto end state, respectively.

As is apparent from the respective graphs, the zoom lens according to Example 2 shows superb optical performance as a result of good corrections to various aberrations in each focal length state from the wide-angle end state through the telephoto end state even upon carrying out vibration reduction.

Example 3

Figure 9:
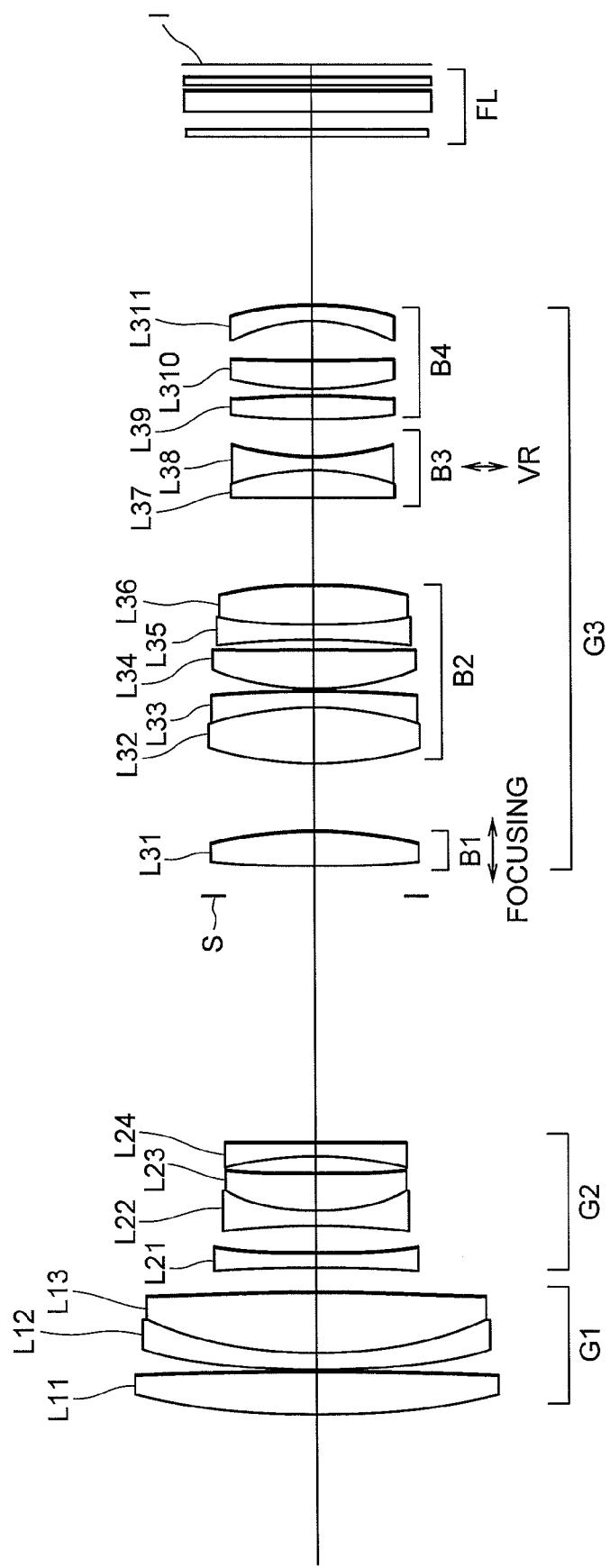
FIG. 9 is a sectional view showing a lens construction of a zoom lens according to Example 3 of the present application.

FIG. 9 is a sectional view showing a lens construction of a zoom lens according to Example 3 of the present application in a wide-angle end state upon focusing on an infinitely distant object.

The zoom lens according to Example 3 is composed of, in order from an object side, a first lens group G1 having positive refractive power, a second lens group G2 having negative refractive power, and a third lens group G3 having positive refractive power.

The first lens group G1 is composed of, in order from the object side, a double convex positive lens L11, and a cemented lens constructed by a negative meniscus lens L12 having a convex surface facing the object side cemented with a double convex positive lens L13.

The second lens group G2 is composed of, in order from the object side, a double concave negative lens L21, a cemented lens constructed by a double concave negative lens L22 cemented with a positive meniscus lens L23 having a convex surface facing the object side, and a double concave negative lens L24.

The third lens group G3 is composed of, in order from the object side, an aperture stop S, a first sub-group B1 having positive refractive power, a second sub-group B2 having positive refractive power, a third sub-group B3 having negative refractive power, and a fourth sub-group B4 having positive refractive power.

The first sub-group B1 is composed of a double convex positive lens L31 only.

The second sub-group B2 is composed of, in order from the object side, a cemented lens constructed by a double convex positive lens L32 cemented with a negative meniscus lens L33 having a concave surface facing the object side, a positive meniscus lens L34 having a convex surface facing the object side, and a cemented lens constructed by a double concave negative lens L35 cemented with a double convex positive lens L36.

The third sub-group B3 is composed of, in order from the object side, a cemented lens constructed by a positive meniscus lens L37 having a concave surface facing the object side cemented with a double concave negative lens L38 only.

The fourth sub-group B4 is composed of, in order from the object side, a double convex positive lens L39, a positive meniscus lens L310 having a convex surface facing the object side, and a negative meniscus lens L311 having a concave surface facing the object side.

Incidentally, a filter group FL is disposed in the vicinity of the image plane I. The filter group FL is composed of, in order from the object side, a dustproof glass, an optical low-pass filter, and a cover glass for a solid-state imaging device.

In the zoom lens according to Example 3, upon zooming from a wide-angle end state to a telephoto end state, the first lens group G1 is moved to the object side, the second lens group G2 is moved at first to the image side and then to the object side, and the third lens group G3 is moved to the object side such that a distance between the first lens group G1 and the second lens group G2 varies, and a distance between the second lens group G2 and the third lens group G3 varies.

In the zoom lens according Example 3, the first sub-group B1 in the third lens group G3 is moved along an optical axis, thereby carrying out focusing from an infinitely distant object to a close object.

In the zoom lens according to Example 3, the third sub-group B3 in the third lens group G3 is moved in a direction including a component perpendicular to the optical axis, thereby carrying out vibration reduction.

In the zoom lens according to Example 3, in the wide-angle end state, the vibration reduction coefficient is 1.256, the focal length is 30.00000 (mm), so that in order to correct a rotational camera shake of 0.30 degrees, the moving amount of the third sub-group B3 is 0.125 (mm). In the telephoto end state, the vibration reduction coefficient is 1.867, the focal length is 107.00000 (mm), so that in order to correct a rotational camera shake of 0.30 degrees, the moving amount of the third sub-group B3 is 0.300 (mm).

Incidentally, a diagonal length between the center and a corner of the solid-state imaging device in the zoom lens according to Example 3 is 8.5 mm.

Various values associated with the zoom lens according to Example 3 are listed below in Table 3.

TABLE 3

Example 3

(Surface Data)

| m | r | d | nd | ng | nC | nF |
|---|---|---|---|---|---|---|
| Op | ∞ | | | | | |
| 1) | 57.27846 | 2.90000 | 1.487490 | 1.495944 | 1.485343 | 1.492276 |
| 2) | −500.00000 | 0.10000 | | | | |
| 3) | 49.66256 | 1.10000 | 1.795040 | 1.831551 | 1.787036 | 1.814745 |
| 4) | 29.87819 | 4.10000 | 1.497820 | 1.505256 | 1.495980 | 1.502009 |
| 5) | −500.00086 | (d5) | | | | |
| 6) | −103.64515 | 1.00000 | 1.516800 | 1.526741 | 1.514315 | 1.522405 |
| 7) | 41.82216 | 1.84258 | | | | |
| 8) | −88.73332 | 1.00000 | 1.795000 | 1.817109 | 1.789742 | 1.807287 |
| 9) | 14.34679 | 2.60000 | 1.846660 | 1.894197 | 1.836505 | 1.872084 |
| 10) | 88.54415 | 1.09385 | | | | |
| 11) | −24.07528 | 1.00000 | 1.612720 | 1.625706 | 1.609539 | 1.620006 |
| 12) | 499.99839 | (d12) | | | | |
| 13) (S) | ∞ | (d13) | | | | |
| 14) | 77.09831 | 2.42127 | 1.487490 | 1.495944 | 1.485343 | 1.492276 |
| 15) | −29.35673 | (d15) | | | | |
| 16) | 22.30179 | 3.77498 | 1.497820 | 1.505256 | 1.495980 | 1.502009 |
| 17) | −22.30179 | 1.10000 | 1.850260 | 1.884512 | 1.842602 | 1.868883 |
| 18) | −187.60046 | 0.10000 | | | | |
| 19) | 17.68001 | 2.67864 | 1.563840 | 1.575320 | 1.561006 | 1.570294 |
| 20) | 500.00000 | 0.63386 | | | | |
| 21) | −57.46079 | 1.00000 | 1.850260 | 1.884512 | 1.842602 | 1.868883 |
| 22) | 30.53255 | 2.75582 | 1.603420 | 1.623865 | 1.598747 | 1.614615 |
| 23) | −30.53256 | 5.91025 | | | | |
| 24) | −500.00000 | 1.85000 | 1.846660 | 1.894197 | 1.836505 | 1.872084 |
| 25) | −17.06821 | 0.95000 | 1.806100 | 1.831111 | 1.800248 | 1.819921 |
| 26) | 17.06821 | 2.50000 | | | | |
| 27) | 47.38910 | 1.65847 | 1.517420 | 1.529871 | 1.514429 | 1.524341 |
| 28) | −79.04504 | 0.39084 | | | | |
| 29) | 20.55261 | 1.99178 | 1.517420 | 1.529871 | 1.514429 | 1.524341 |
| 30) | 78.08490 | 2.64819 | | | | |
| 31) | −10.84436 | 1.10000 | 1.755000 | 1.772953 | 1.750628 | 1.765054 |
| 32) | −20.44516 | (d32) | | | | |
| 33) | ∞ | 0.50000 | 1.516800 | 1.526741 | 1.514315 | 1.522405 |
| 34) | ∞ | 1.11000 | | | | |
| 35) | ∞ | 1.59000 | 1.516800 | 1.526741 | 1.514315 | 1.522405 |
| 36) | ∞ | 0.30000 | | | | |
| 37) | ∞ | 0.70000 | 1.516800 | 1.526741 | 1.514315 | 1.522405 |
| 38) | ∞ | 0.70003 | | | | |
| I | ∞ | | | | | |

TABLE 3-continued

Example 3

(Various Data)
zoom ratio: 3.57

|  | W | M | T |
|---|---|---|---|
| f | 30.00003 | 60.00007 | 107.00018 |
| FNO | 3.976 | 4.572 | 5.742 |

(Distances upon focusing on an infinitely distant object)

|  | W | M | T |
|---|---|---|---|
| d5 | 1.69000 | 14.83163 | 19.60065 |
| d12 | 16.67744 | 8.94307 | 1.86679 |
| d13 | 1.97000 | 1.97000 | 1.97000 |
| d15 | 4.55131 | 4.55131 | 4.55131 |
| d32 | 11.30972 | 16.48945 | 26.71178 |
| SUM. D | 75.08928 | 80.49654 | 78.18928 |
| T.L. | 91.29903 | 101.88601 | 109.80106 |
| ACT. L. | 90.34843 | 100.9354 | 108.8505 |
| Bf | 16.20976 | 21.38948 | 31.61181 |
| ACBf | 15.25915 | 20.43888 | 30.66121 |

(Distances upon focusing on a close object)

|  | W | M | T |
|---|---|---|---|
| d5 | 1.69000 | 14.83163 | 19.60065 |
| d12 | 16.67744 | 8.94307 | 1.86679 |
| d13 | 2.73254 | 3.85681 | 4.96131 |
| d15 | 3.78877 | 2.66450 | 1.56000 |
| d32 | 11.30972 | 16.48945 | 26.71178 |
| SUM. D | 75.08928 | 80.49654 | 78.18928 |
| T.L. | 91.29903 | 101.88601 | 109.80106 |

(Moving Amounts of VR lens and image plane I upon VR)

|  | W | M | T |
|---|---|---|---|
| f | 30.00000 | 60.00000 | 107.00000 |
| VR lens | ±0.125 | ±0.213 | ±0.300 |
| I | ±0.157 | ±0.314 | ±0.560 |
| β | −0.03154 | −0.06033 | −0.10411 |
| VR lens | ±0.125 | ±0.213 | ±0.300 |
| I | ±0.157 | ±0.314 | ±0.560 |

(Values for Conditional Expressions)

| (1) (Ft × Fw)/(F3 × X3) = | 11.042 |
|---|---|
| (2) F3/Ft = | 0.176 |
| (3) F1/Ft = | 0.566 |
| (4) \|β3\| = | 2.749 |

Figure 10A:
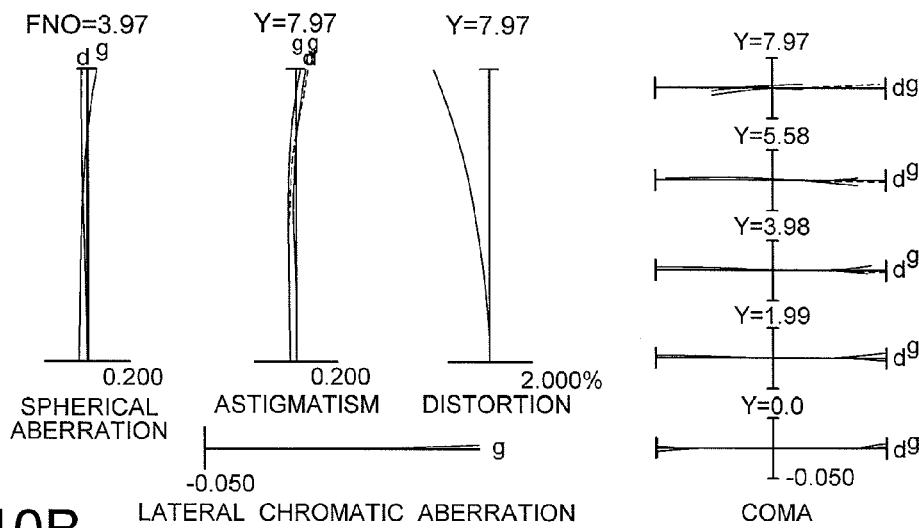
FIGS. 10A, 10B and 10C are graphs showing various aberrations of the zoom lens according to Example 3 upon focusing on an infinitely distant object in a wide-angle end state, in an intermediate focal length state and in a telephoto end state, respectively.
Figure 10B:
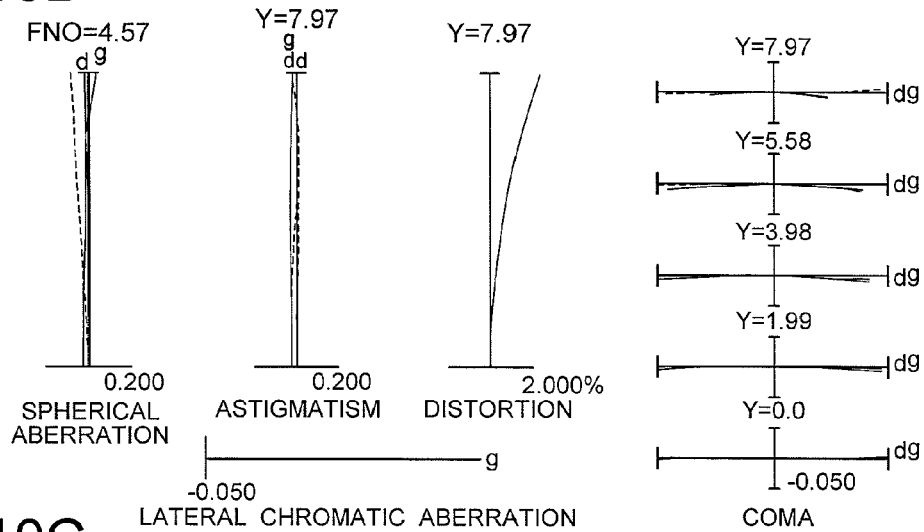
Figure 10C:
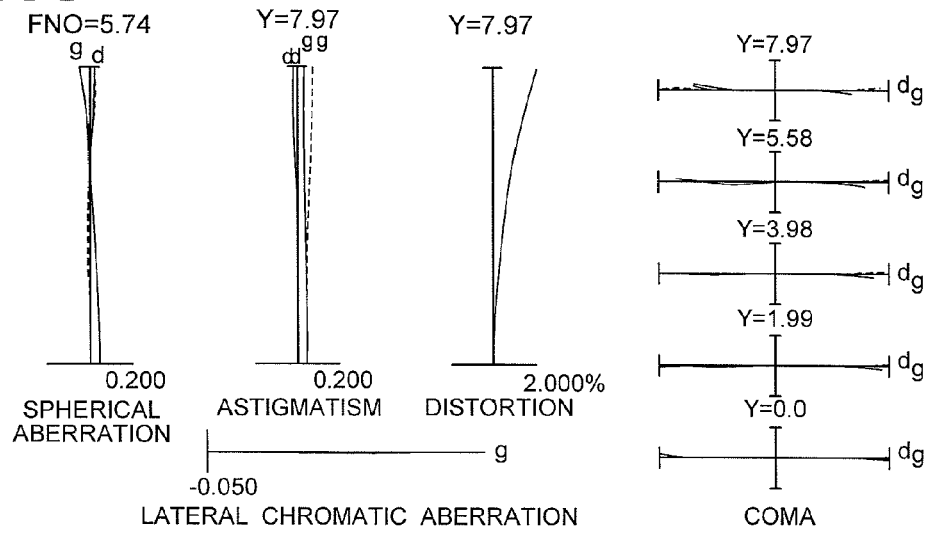

FIGS. 10A, 10B and 10C are graphs showing various aberrations of the zoom lens according to Example 3 upon focusing on an infinitely distant object in a wide-angle end state, in an intermediate focal length state and in a telephoto end state, respectively.

Figure 11A:
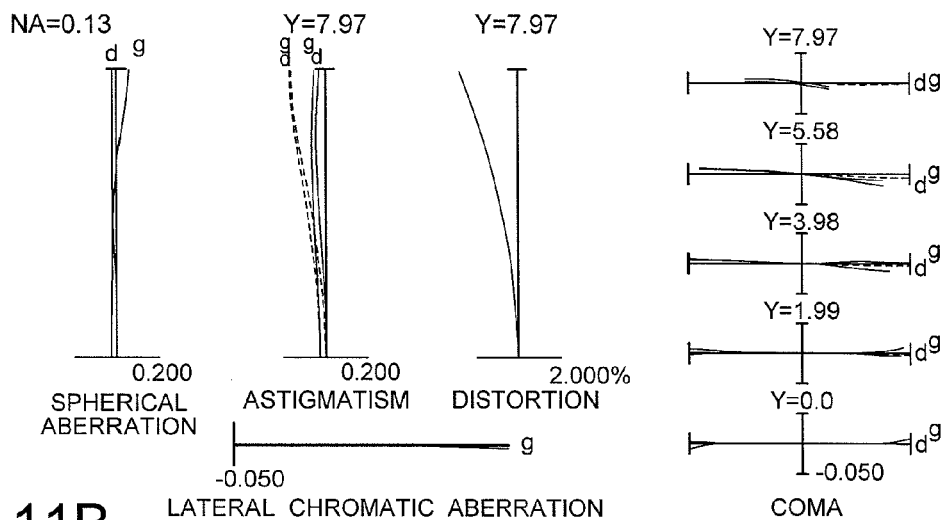
FIGS. 11A, 11B and 11C are graphs showing various aberrations of the zoom lens according to Example 3 upon focusing on a close object in the wide-angle end state, in the intermediate focal length state and in the telephoto end state, respectively.
Figure 11B:
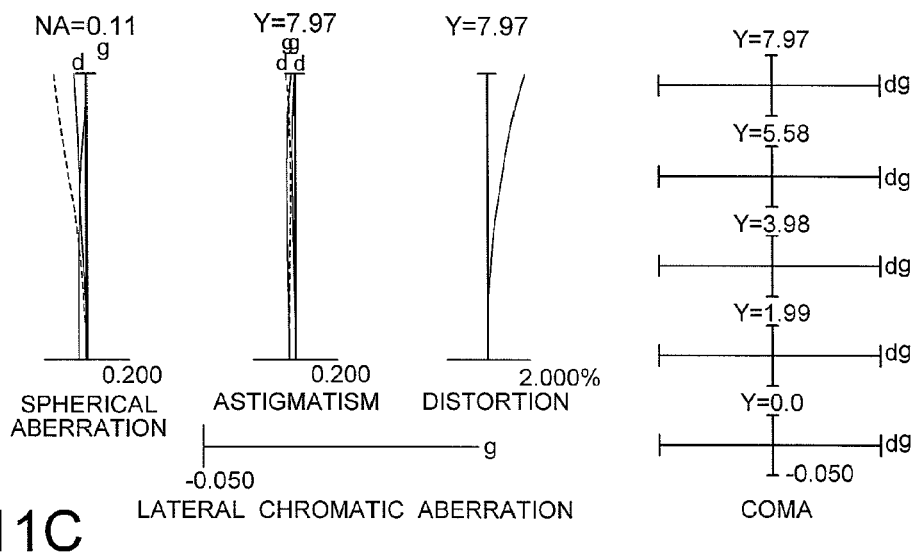
Figure 11C:
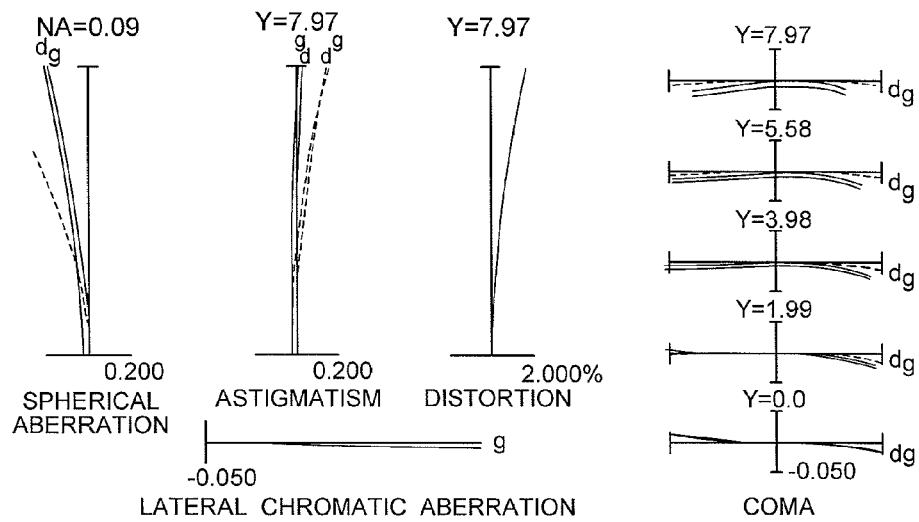

FIGS. 11A, 11B and 11C are graphs showing various aberrations of the zoom lens according to Example 3 upon focusing on a close object in the wide-angle end state, in the intermediate focal length state and in the telephoto end state, respectively.

Figure 12A:
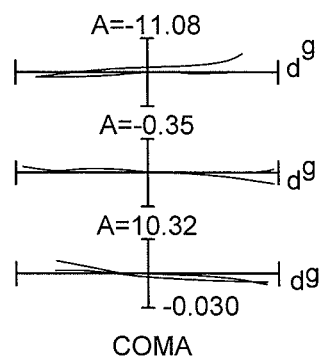
FIGS. 12A and 12B are graphs showing coma of the zoom lens according to Example 3 upon focusing on an infinitely distant object and carrying out vibration reduction in the wide-angle end state and in the telephoto end state, respectively.
Figure 12B:
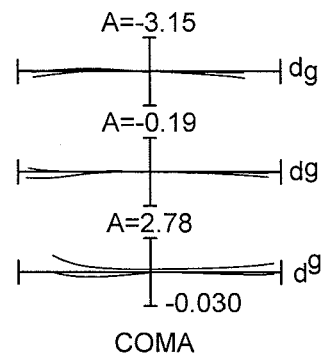

FIGS. 12A and 12B are graphs showing coma of the zoom lens according to Example 3 upon focusing on an infinitely distant object and carrying out vibration reduction in the wide-angle end state and in the telephoto end state, respectively.

As is apparent from the respective graphs, the zoom lens according to Example 3 shows superb optical performance as a result of good corrections to various aberrations in each focal length state from the wide-angle end state through the telephoto end state even upon carrying out vibration reduction.

Example 4

Figure 13:
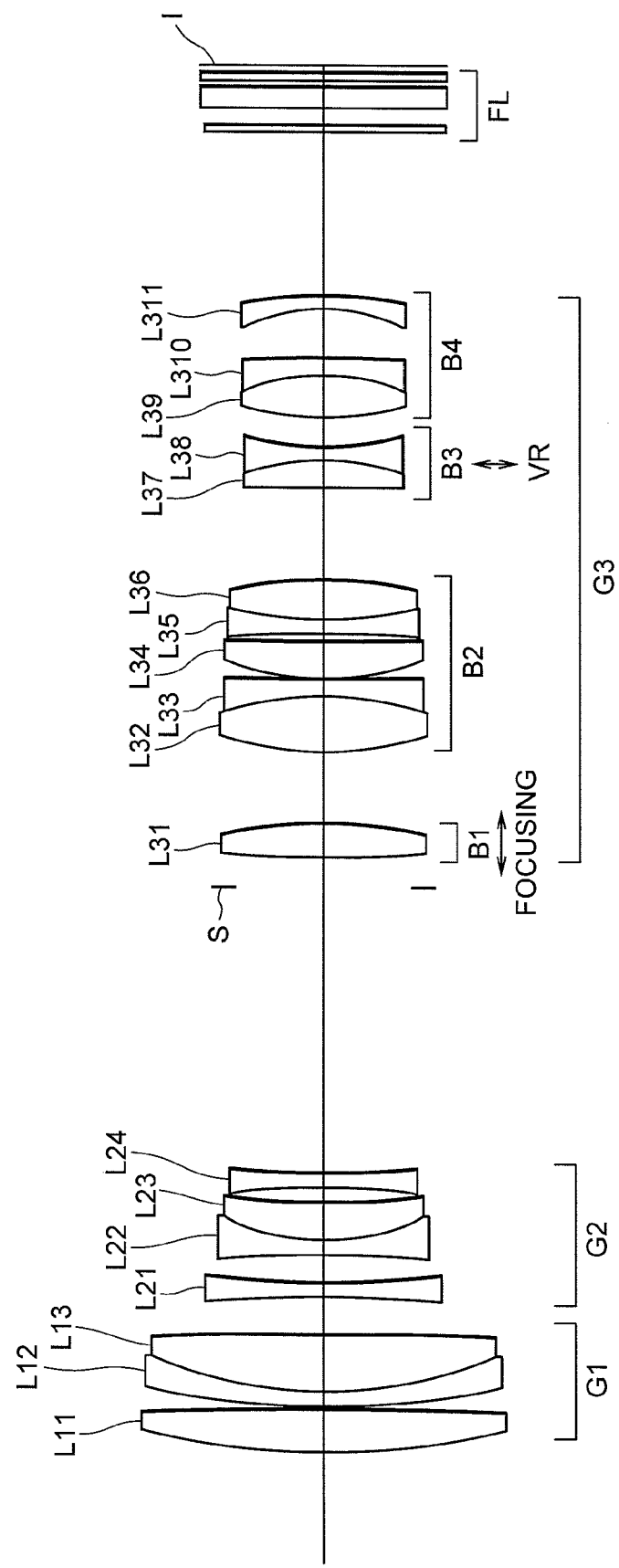
FIG. 13 is a sectional view showing a lens construction of a zoom lens according to Example 4 of the present application.

FIG. 13 is a sectional view showing a lens construction of a zoom lens according to Example 4 of the present application in a wide-angle end state upon focusing on an infinitely distant object.

The zoom lens according to Example 4 is composed of, in order from an object side, a first lens group G1 having positive refractive power, a second lens group G2 having negative refractive power, and a third lens group G3 having positive refractive power.

The first lens group G1 is composed of, in order from the object side, a double convex positive lens L11, and a cemented lens constructed by a negative meniscus lens L12 having a convex surface facing the object side cemented with a double convex positive lens L13.

The second lens group G2 is composed of, in order from the object side, a double concave negative lens L21, a cemented lens constructed by a double concave negative lens L22 cemented with a positive meniscus lens L23 having a convex surface facing the object side, and a double concave negative lens L24.

The third lens group G3 is composed of, in order from the object side, an aperture stop S, a first sub-group B1 having positive refractive power, a second sub-group B2 having positive refractive power, a third sub-group B3 having negative refractive power, and a fourth sub-group B4 having positive refractive power.

The first sub-group B1 is composed of a double convex positive lens L31 only.

The second sub-group B2 is composed of, in order from the object side, a cemented lens constructed by a double convex positive lens L32 cemented with a negative meniscus lens L33 having a concave surface facing the object side, a positive meniscus lens L34 having a convex surface facing the object side, and a cemented lens constructed by a double concave negative lens L35 cemented with a double convex positive lens L36.

The third sub-group B3 is composed of, in order from the object side, a cemented lens constructed by a positive meniscus lens L37 having a concave surface facing the object side cemented with a double concave negative lens L38 only.

The fourth sub-group B4 is composed of, in order from the object side, a cemented lens constructed by a double convex positive lens L39 cemented with a negative meniscus lens L310 having a concave surface facing the object side, and a negative meniscus lens L311 having a concave surface facing the object side.

Incidentally, a filter group FL is disposed in the vicinity of the image plane I. The filter group FL is composed of, in order from the object side, a dustproof glass, an optical low-pass filter, and a cover glass for a solid-state imaging device.

In the zoom lens according to Example 4, upon zooming from a wide-angle end state to a telephoto end state, the first lens group G1 is moved to the object side, the second lens group G2 is moved at first to the object side and then to the image side and then to the object side again, and the third lens group G3 is moved at first to the image side and then to the object side such that a distance between the first lens group G1 and the second lens group G2 varies, and a distance between the second lens group G2 and the third lens group G3 varies.

In the zoom lens according to Example 4, the first sub-group B1 in the third lens group G3 is moved along an optical axis, thereby carrying out focusing from an infinitely distant object to a close object.

In the zoom lens according to Example 4, the third sub-group B3 in the third lens group G3 is moved in a direction including a component perpendicular to the optical axis, thereby carrying out vibration reduction.

In the zoom lens according to Example 4, in the wide-angle end state, the vibration reduction coefficient is 1.266, the focal length is 30.00000 (mm), so that in order to correct a rotational camera shake of 0.30 degrees, the moving amount of the third sub-group B3 is 0.124 (mm). In the telephoto end state, the vibration reduction coefficient is 1.892, the focal length is 107.00000 (mm), so that in order to correct a rotational camera shake of 0.30 degrees, the moving amount of the third sub-group B3 is 0.296 (mm).

Incidentally, a diagonal length between the center and a corner of the solid-state imaging device in the zoom lens according to Example 4 is 8.5 mm.

Various values associated with the zoom lens according to Example 4 are listed below in Table 4.

TABLE 4

Example 4

(Surface Data)

| m | r | d | nd | ng | nC | nF |
|---|---|---|---|---|---|---|
| Op | ∞ | | | | | |
| 1) | 51.16724 | 2.92000 | 1.487490 | 1.495944 | 1.485343 | 1.492276 |
| 2) | −520.00000 | 0.10000 | | | | |
| 3) | 52.91480 | 1.10000 | 1.795040 | 1.831549 | 1.787036 | 1.814744 |
| 4) | 29.50000 | 3.90000 | 1.497820 | 1.505256 | 1.495980 | 1.502009 |
| 5) | −297.28610 | (d5) | | | | |
| 6) | −90.00000 | 1.00000 | 1.516800 | 1.526741 | 1.514315 | 1.522405 |
| 7) | 57.27273 | 1.85781 | | | | |
| 8) | −82.14254 | 1.00000 | 1.622990 | 1.636276 | 1.619729 | 1.630448 |
| 9) | 14.74805 | 2.60000 | 1.846660 | 1.894194 | 1.836505 | 1.872083 |
| 10) | 59.21830 | 0.94287 | | | | |
| 11) | −34.40925 | 1.00000 | 1.744000 | 1.765005 | 1.739042 | 1.755647 |
| 12) | 54.96721 | (d12) | | | | |
| 13) (S) | ∞ | (d13) | | | | |
| 14) | 87.22992 | 2.40000 | 1.487490 | 1.495944 | 1.485343 | 1.492276 |
| 15) | −27.61149 | (d15) | | | | |
| 16) | 20.56591 | 3.85000 | 1.497820 | 1.505256 | 1.495980 | 1.502009 |
| 17) | −20.56591 | 1.10000 | 1.850260 | 1.884510 | 1.842602 | 1.868882 |
| 18) | 233.23326 | 0.10000 | | | | |
| 19) | 20.44605 | 2.54000 | 1.700000 | 1.718349 | 1.695645 | 1.710196 |
| 20) | 500.00000 | 0.39482 | | | | |
| 21) | −70.40839 | 1.00000 | 1.834000 | 1.862765 | 1.827379 | 1.849807 |
| 22) | 28.04409 | 2.74000 | 1.548140 | 1.563440 | 1.544550 | 1.556594 |
| 23) | −28.04409 | 6.17670 | | | | |
| 24) | −285.32383 | 1.85000 | 1.846660 | 1.894194 | 1.836505 | 1.872083 |
| 25) | −17.47065 | 0.95000 | 1.766840 | 1.787447 | 1.761914 | 1.778307 |
| 26) | 17.47065 | 2.05000 | | | | |
| 27) | 22.79378 | 2.88000 | 1.700000 | 1.718349 | 1.695645 | 1.710196 |
| 28) | −13.64921 | 1.20000 | 1.749500 | 1.777038 | 1.743271 | 1.764534 |
| 29) | −55.38319 | 3.27314 | | | | |
| 30) | −11.44807 | 1.00000 | 1.755000 | 1.772952 | 1.750628 | 1.765054 |
| 31) | −23.75201 | (d31) | | | | |
| 32) | ∞ | 0.50000 | 1.516800 | 1.526741 | 1.514315 | 1.522405 |
| 33) | ∞ | 1.11000 | | | | |
| 34) | ∞ | 1.59000 | 1.516800 | 1.526741 | 1.514315 | 1.522405 |
| 35) | ∞ | 0.30000 | | | | |
| 36) | ∞ | 0.70000 | 1.516800 | 1.526741 | 1.514315 | 1.522405 |
| 37) | ∞ | 0.70051 | | | | |
| I | ∞ | | | | | |

TABLE 4-continued

Example 4

(Various Data)
zoom ratio: 3.57

|  | W | M | T |
|---|---|---|---|
| f | 30.00032 | 60.00068 | 107.00136 |
| FNO | 3.776 | 4.507 | 5.791 |

(Distances upon focusing on an infinitely distant object)

|  | W | M | T |
|---|---|---|---|
| d5 | 2.50342 | 12.62584 | 16.46761 |
| d12 | 19.44128 | 9.69110 | 1.84000 |
| d13 | 1.97000 | 1.97000 | 1.97000 |
| d15 | 4.66384 | 4.66384 | 4.66384 |
| d31 | 10.96381 | 17.63977 | 29.42176 |
| SUM. D | 78.50388 | 78.87612 | 74.86679 |
| T.L. | 94.36822 | 101.41645 | 109.18914 |
| ACT. L. | 93.41759 | 100.46580 | 108.23850 |
| Bf | 15.86431 | 22.54028 | 34.32227 |
| ACBf | 14.91371 | 21.58968 | 33.37167 |

(Distances upon focusing on a close object)

|  | W | M | T |
|---|---|---|---|
| d5 | 2.50342 | 12.62584 | 16.46761 |
| d12 | 19.44128 | 9.69110 | 1.84000 |
| d13 | 3.0102 | 4.13015 | 5.07384 |
| d15 | 3.62364 | 2.50369 | 1.56000 |
| d31 | 10.96381 | 17.63977 | 29.42176 |
| SUM. D | 78.50388 | 78.87612 | 74.86679 |
| T.L. | 94.36822 | 101.41645 | 109.18914 |

(Moving Amounts of VR lens and image plane I upon VR)

|  | W | M | T |
|---|---|---|---|
| f | 30.00000 | 60.00000 | 107.00000 |
| VR lens | ±0.124 | ±0.215 | ±0.296 |
| I | ±0.157 | ±0.314 | ±0.560 |
| β | −0.03154 | −0.06033 | −0.10411 |
| VR lens | ±0.124 | ±0.215 | ±0.296 |
| I | ±0.157 | ±0.314 | ±0.560 |

(Values for Conditional Expressions)

(1) (Ft × Fw)/(F3 × X3) = 10.401
(2) F3/Ft = 0.187
(3) F1/Ft = 0.550
(4) |β3| = 2.656

Figure 14A:
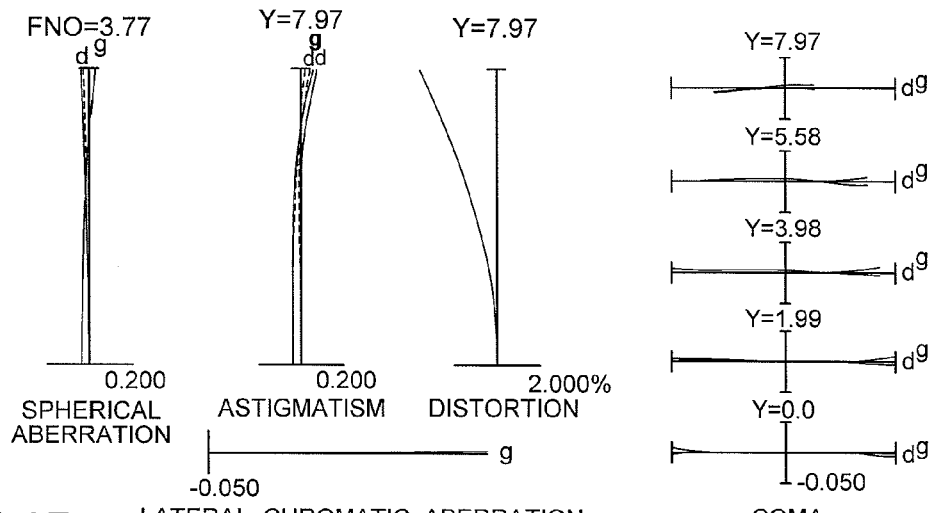
FIGS. 14A, 14B and 14C are graphs showing various aberrations of the zoom lens according to Example 4 upon focusing on an infinitely distant object in a wide-angle end state, in an intermediate focal length state and in a telephoto end state, respectively.
Figure 14B:
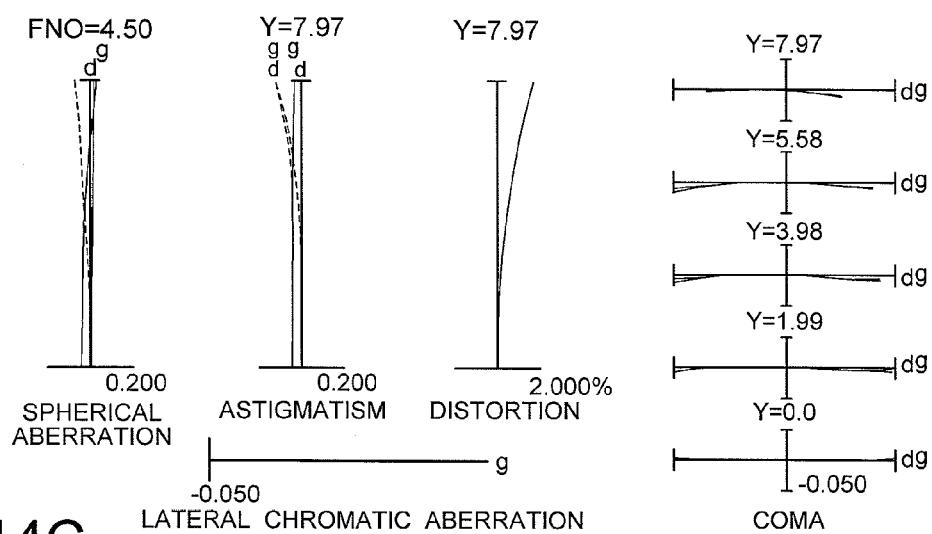
Figure 14C:
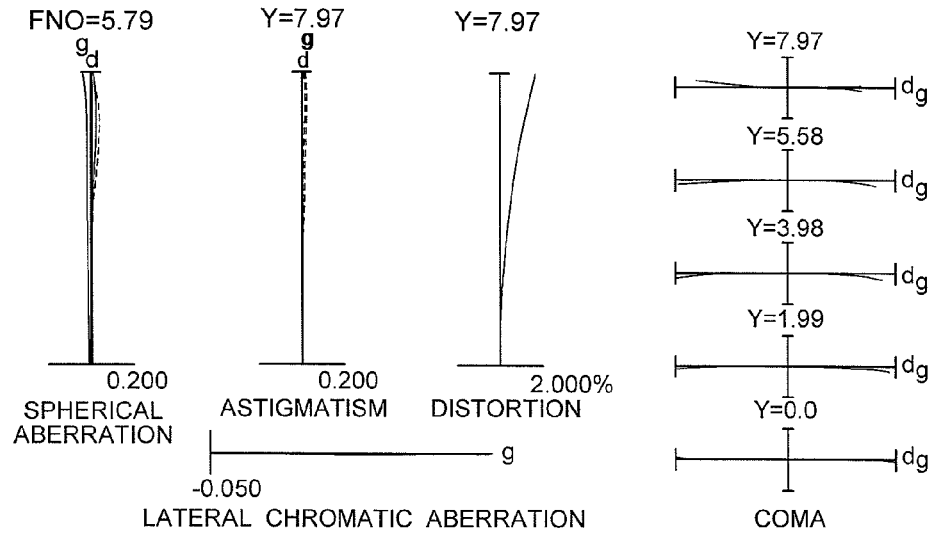

FIGS. 14A, 14B and 14C are graphs showing various aberrations of the zoom lens according to Example 4 upon focusing on an infinitely distant object in a wide-angle end state, in an intermediate focal length state and in a telephoto end state, respectively.

Figure 15A:
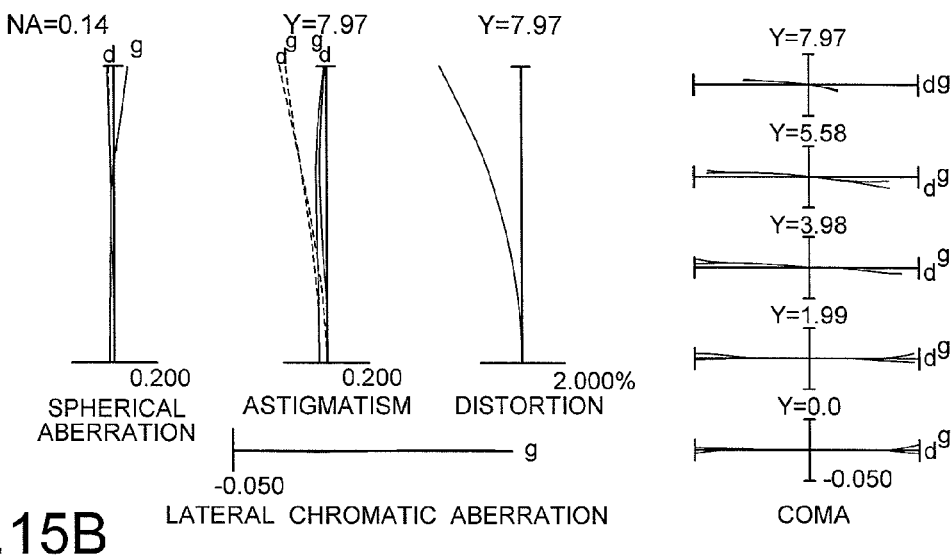
FIGS. 15A, 15B and 15C are graphs showing various aberrations of the zoom lens according to Example 4 upon focusing on a close object in the wide-angle end state, in the intermediate focal length state and in the telephoto end state, respectively.
Figure 15B:
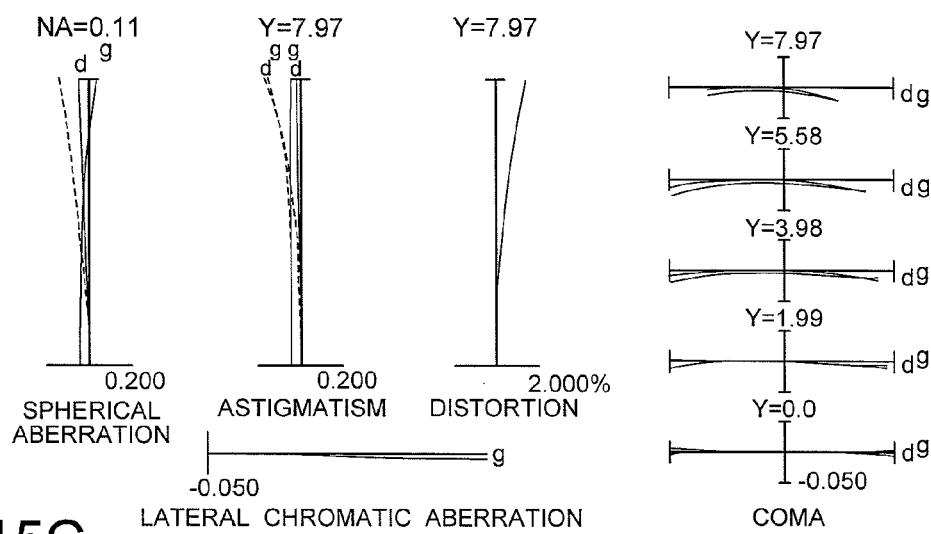
Figure 15C:
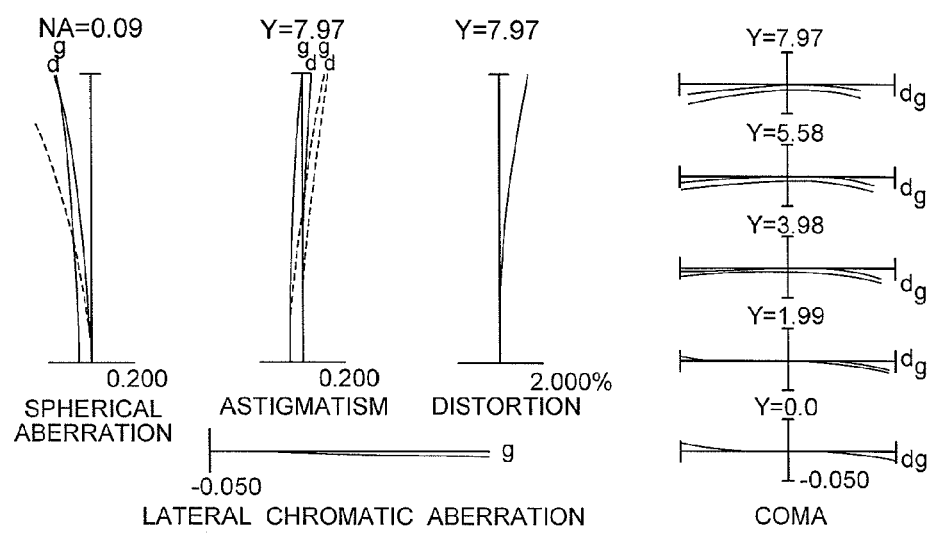

FIGS. 15A, 15B and 15C are graphs showing various aberrations of the zoom lens according to Example 4 upon focusing on a close object in the wide-angle end state, in the intermediate focal length state and in the telephoto end state, respectively.

Figure 16A:
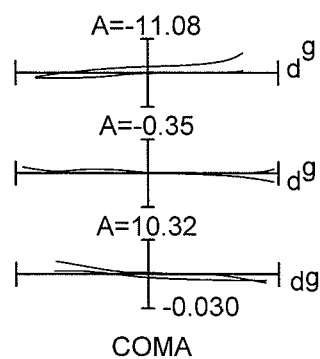
FIGS. 16A and 16B are graphs showing coma of the zoom lens according to Example 4 upon focusing on an infinitely distant object and carrying out vibration reduction in the wide-angle end state and in the telephoto end state, respectively.
Figure 16B:
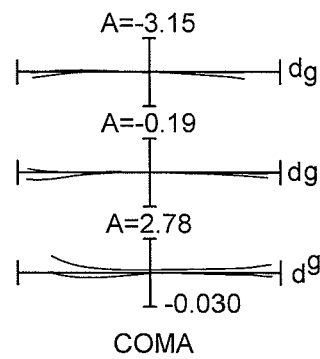

FIGS. 16A and 16B are graphs showing coma of the zoom lens according to Example 4 upon focusing on an infinitely distant object and carrying out vibration reduction in the wide-angle end state and in the telephoto end state, respectively.

As is apparent from the respective graphs, the zoom lens according to Example 4 shows superb optical performance as a result of good corrections to various aberrations in each focal length state from the wide-angle end state through the telephoto end state even upon carrying out vibration reduction.

According to the above-described each Example, it becomes possible to realize a zoom lens having high optical performance and being compact with disposing a lens for focusing and a lens for vibration reduction in the same lens group.

In a zoom lens according to each Example, since mutual movements of sub-groups in the third lens group do not exist except upon focusing or vibration reduction, the focusing lens and the vibration reduction lens can be moved in a body upon zooming, so that it becomes easy to make the zoom lens compact.

Moreover, in a zoom lens according to each Example, with introducing a so-called internal focusing system by carrying out focusing with a lens having a small diameter, the weight of the focusing lens can be lightened, and the moving amount thereof can be small. Accordingly, focusing can be carried out silently.

Incidentally, the above-described each. Example shows a specific example of the present application. Accordingly, the present application is not limited to the specific details and representative devices.

The following description may suitably be applied within limits that do not deteriorate optical performance.

Although a three-lens-group configuration is shown as each numerical example of a zoom lens according to the present application, the present application is not limited to this, and a zoom lens having other lens configuration such as a four-lens-group configuration may be constructed. Specifically, a lens configuration in which a lens or a lens group is added to the most object side, or the most image side may be possible. Incidentally, the lens group is defined as a portion having at least one lens that is separated from the first through third lens groups according to the present application by air spaces that vary upon zooming.

In a zoom lens according to the present application, in order to vary focusing from an infinitely distant object to a close object, a portion of a lens group, a single lens group or a plurality of lens groups may be moved as a focusing lens group along the optical axis. It is particularly preferable that at least a portion of the third lens group is used as the focusing lens group. In this case, the focusing lens group may be used for auto focus, and suitable for being driven by a motor for auto focus such as an ultrasonic motor.

In a zoom lens according to the present application, a lens group or a portion of a lens group may be moved in a direction having a component perpendicular to the optical axis, or made a rotational movement, in other words, swayed in a direction including the optical axis for making it as a vibration reduction lens group that corrects an image blur caused by a camera shake. It is particularly preferable in a zoom lens according to the present application that at lest a portion of the third lens group is made to be the vibration reduction lens group.

Moreover, any lens surface in a zoom lens according to the present application may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable. When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

In a zoom lens according to the present application, although an aperture stop is preferably disposed in the third lens group, the function may be substituted by a lens frame without disposing a member as an aperture stop.

An antireflection coating having high transmittance over a broad wavelength range may be applied to each lens surface in a zoom lens according to the present application. Accordingly, high optical performance with a high contrast can be achieved with reducing flare or ghost images.

Then, a camera according to the present application is explained with reference to FIGS. 17A, 17B and 18.

Figure 17A:
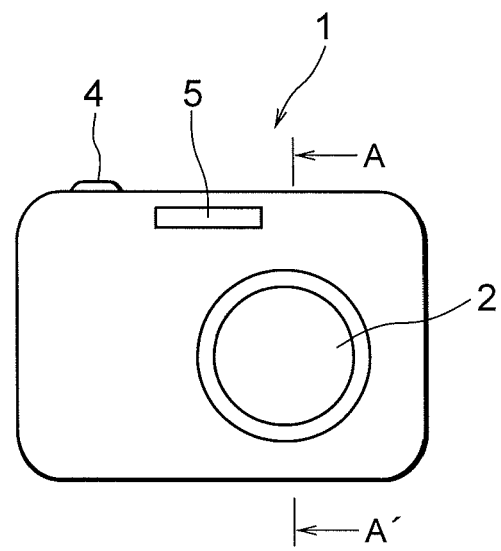
FIGS. 17A and 17B are a front view and a rear view, respectively, of an electronic camera equipped with a zoom lens according to the present invention.
Figure 17B:
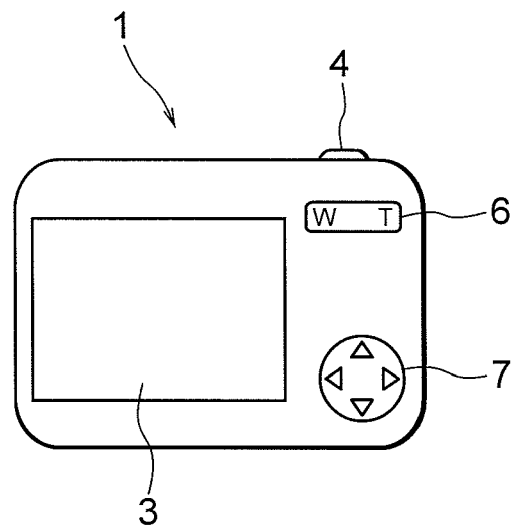

FIGS. 17A and 17B are a front view and a rear view, respectively, showing an electronic camera equipped with a zoom lens according to the present application. FIG. 18 is a sectional view along A-A' line in FIG. 17A.

Figure 18:
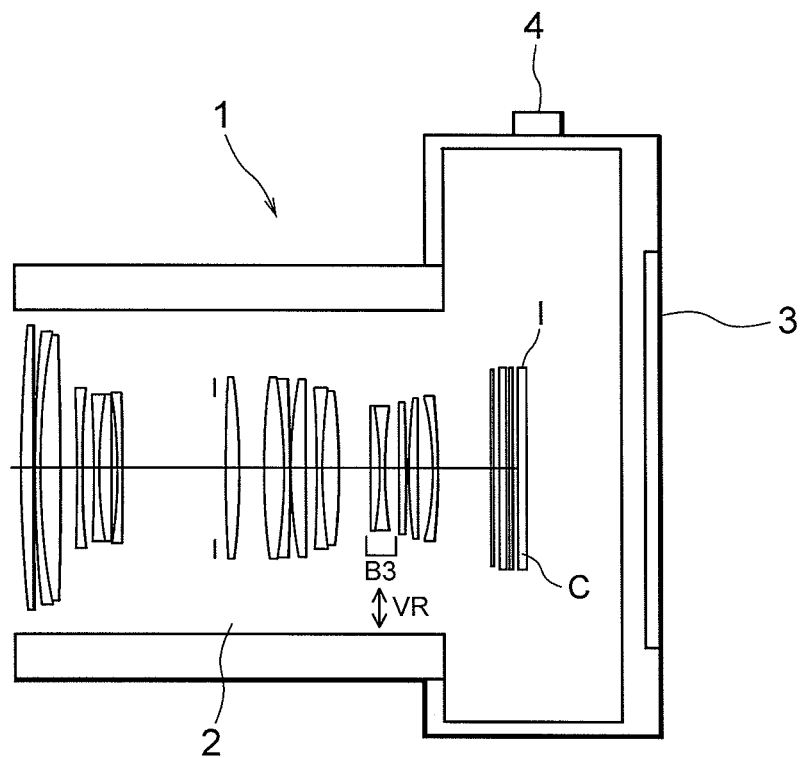
FIG. 18 is a sectional view along A-A' shown in FIG. 17A.

As shown in FIGS. 17A, 17B and 18, the camera 1 is a lens-interchangeable electronic still camera equipped with the zoom lens according to Example 1 as an image-taking lens 2.

In the camera 1, light rays from an unillustrated object are converged on an imaging device C (for example, a CCD or CMOS) by the image-taking lens 2, and an image of the object is formed. With pressing an unillustrated power switch button down by a photographer, the image of the object is captured by the imaging device C, and displayed on a liquid crystal monitor 3 disposed on the backside of the camera 1. After fixing the image composition of the object image with observing the liquid crystal monitor 3, the photographer depresses a release button 4 to take a picture of the object image by the imaging device C, and stored in an unillustrated memory. In this manner, the photographer can take a picture of the object by the camera 1. In the camera 1, an auxiliary light emitter 5 that emits auxiliary light when the object is dark, and a function button 7 that is used for setting various conditions of the camera 1 are further provided.

With constructing in this manner, the camera 1 equipped with the zoom lens according to Example 1 as the image-taking lens 2 makes it possible to realize high optical performance and compactness with disposing a lens for focusing and a lens for vibration reduction in the same lens group. Incidentally, the same effect as the above-described camera 1 can be obtained upon constructing a camera equipped with any one of zoom lenses according to Examples 2, 3 and 4 as an image-taking lens 2. Moreover, the zoom lens according to the present application is not limited to the above-described electronic still camera, and may be applied to other optical apparatuses such as a digital video camera and a film camera. Moreover, the zoom lens according to the present application is not limited to the camera without a quick-return mirror as described above, and may be applied to a single-lens reflex camera.

Lastly, an outline of a method for manufacturing a zoom lens according to the present application is explained with reference to FIG. 19.

Figure 19:
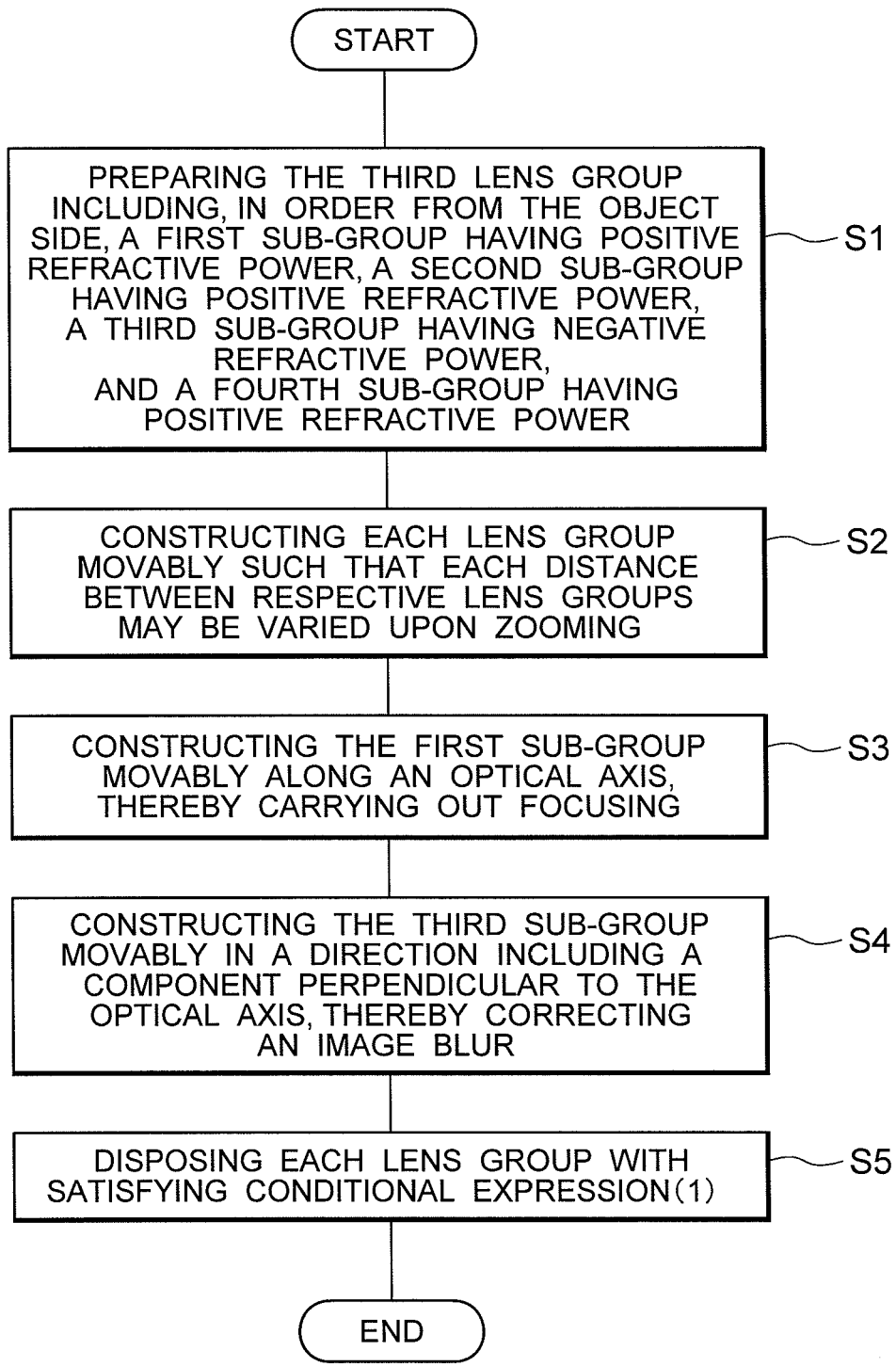
FIG. 19 is a flowchart showing an outline of a method for manufacturing a zoom lens according to the present application.

FIG. 19 is a flowchart showing an outline of a method for manufacturing the zoom lens according to the present application.

The method for manufacturing a zoom lens according to the present application shown in FIG. 19 is a method for manufacturing a zoom lens including, in order from an object side, a first lens group having positive refractive power, a second lens group having negative refractive power and a third lens group having positive refractive power, the method includes the following steps S1 through S5.

Step S1: Preparing the third lens group including, in order from the object side, a first sub-group having positive refractive power, a second sub-group having positive refractive power, a third sub-group having negative refractive power, and a fourth sub-group having positive refractive power, and disposing each lens group into a lens barrel in order from the object side.

Step S2: Constructing each lens group movably such that each distance between respective lens groups may be varied upon zooming by means of disposing a well-known moving mechanism.

Step S3: Constructing the first sub-group movably along an optical axis, thereby carrying out focusing by means of disposing a well-known moving mechanism.

Step S4: Constructing the third sub-group movably in a direction including a component perpendicular to the optical axis by means of disposing a well-known moving mechanism, thereby correcting an image blur.

Step S5: Disposing each lens group with satisfying the following conditional expression (1):

$$0.000 < (Ft \times Fw)/(F3 \times X3) < 13.500 \quad (1)$$

where Ft denotes a focal length of the whole of the zoom lens in a telephoto end state upon focusing on an infinitely distant object, Fw denotes a focal length of the whole of the zoom lens in a wide-angle end state upon focusing on an infinitely distant object, F3 denotes a focal length of the third lens group, and X3 denotes the maximum moving amount of the third lens group.

According to the method for manufacturing a zoom lens according to the present application, it becomes possible to manufacture a zoom lens having high optical performance and being compact with disposing a lens for focusing and a lens for vibration reduction in the same lens group.

What is claimed is:

1. A zoom lens comprising, in order from an object side:
a first lens group having positive refractive power;
a second lens group having negative refractive power; and
a third lens group having positive refractive power,
each distance between respective lens groups varying upon zooming;
the third lens group including, in order from the object side, a first sub-group having positive refractive power, a second sub-group having positive refractive power, a third sub-group having negative refractive power, and a fourth sub-group having positive refractive power,
the first sub-group being movable along the optical axis, thereby carrying out focusing,
the third sub-group being movable in a direction including a component perpendicular to the optical axis, thereby correcting an image blur, and
the following conditional expressions being satisfied:

$$0.000 < (Ft \times Fw)/(F3 \times X3) < 13.500$$

$$2.00 < |\beta 3| < 3.00$$

where Ft denotes a focal length of the whole of the zoom lens in a telephoto end state upon focusing on an infinitely distant object, Fw denotes a focal length of the whole of the zoom lens in a wide-angle end state upon focusing on an infinitely distant object, F3 denotes a focal length of the whole of the third lens group in the telephoto end state upon focusing on an infinitely distant object, X3 denotes the maximum moving amount of the whole of the third lens group upon zooming, and β3 denotes the smallest lateral magnification of the whole of the third lens group.

2. The zoom lens according to claim 1, wherein the following conditional expression is satisfied:

$$0.165 < F3/Ft < 0.250.$$

3. The zoom lens according to claim 1, wherein the following conditional expression is satisfied:

$$0.45 < F1/Ft < 0.70$$

where F1 denotes a focal length of the first lens group.

4. The zoom lens according to claim 1, wherein the fourth sub-group includes at least one positive lens element and at least two negative lens elements.

5. The zoom lens according to claim 1, wherein the fourth sub-group includes at least two positive lens elements and at least one negative lens element.

6. An optical apparatus equipped with the zoom lens according to claim 1.

7. A method for manufacturing a zoom lens including, in order from an object side, a first lens group having positive refractive power, a second lens group having negative refractive power, and a third lens group having positive refractive power, the method comprising steps of:

disposing, in order from the object side, a first sub-group having positive refractive power, a second sub-group having positive refractive power, a third sub-group having negative refractive power, and a fourth sub-group having positive refractive power into the third lens group;
constructing each lens group to be movable such that each distance between respective lens groups may be varied upon zooming;
constructing the first sub-group to be movable along the optical axis, thereby carrying out focusing;
constructing the third sub-group to be movable in a direction including a component perpendicular to the optical axis, thereby correcting an image blur; and
disposing each lens group such that the following conditional expressions are satisfied:

$$0.000 < (Ft \times Fw)/(F3 \times X3) < 13.500$$

$$2.00 < |\beta 3| < 3.00$$

where Ft denotes a focal length of the whole of the zoom lens in a telephoto end state upon focusing on an infinitely distant object, Fw denotes a focal length of the whole of the zoom lens in a wide-angle end state upon focusing on an infinitely distant object, F3 denotes a focal length of the whole of the third lens group in the telephoto end state upon focusing on an infinitely distant object, X3 denotes the maximum moving amount of the whole of the third lens group upon zooming, and β3 denotes the smallest lateral magnification of the whole of the third lens group.

* * * * *